INVENTOR.
Richard Carl Dehmel

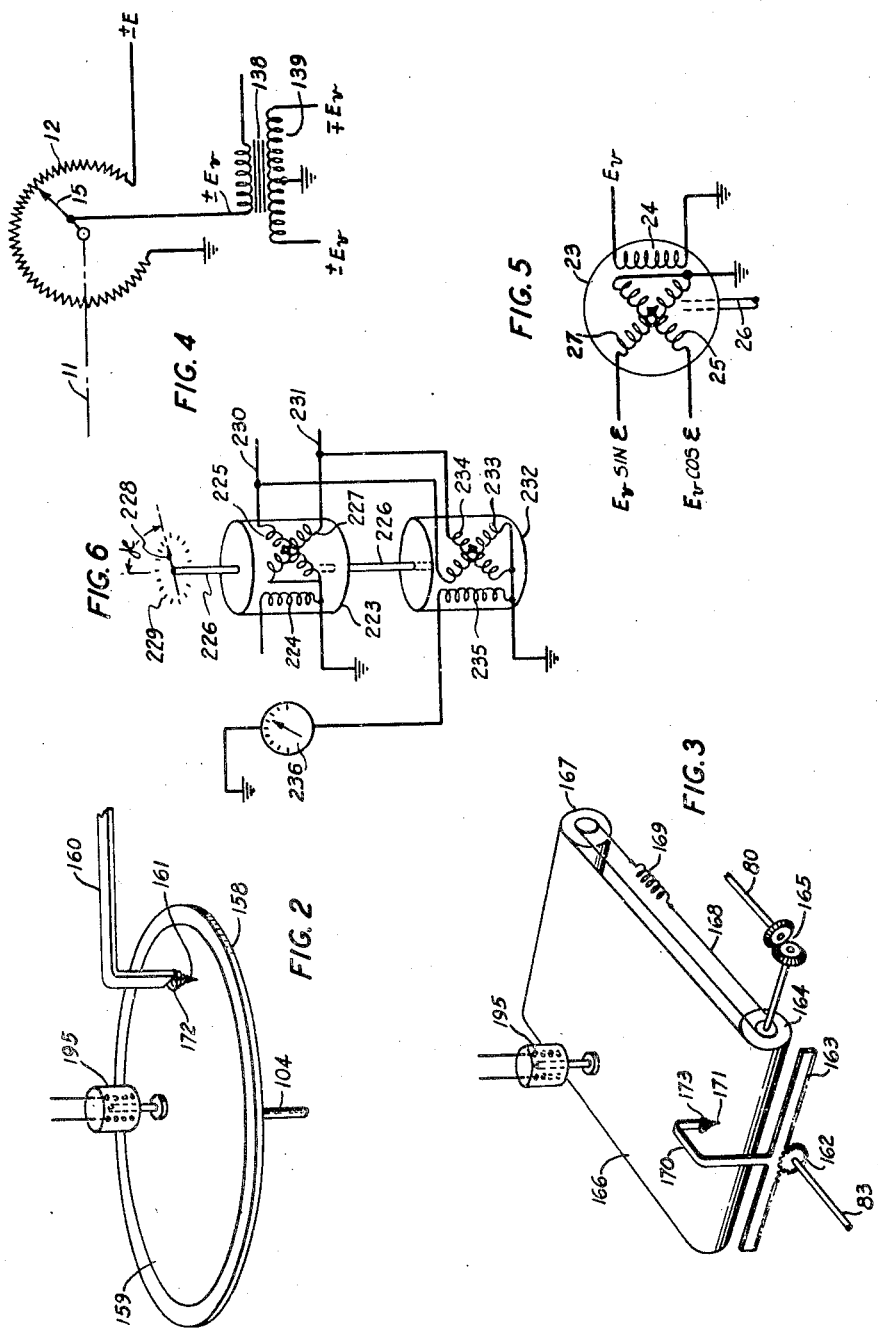

July 5, 1949.    R. C. DEHMEL    2,475,314
NAVIGATION APPARATUS FOR AIRCRAFT AND TRAINING DEVICES
Filed Nov. 25, 1943    5 Sheets-Sheet 3
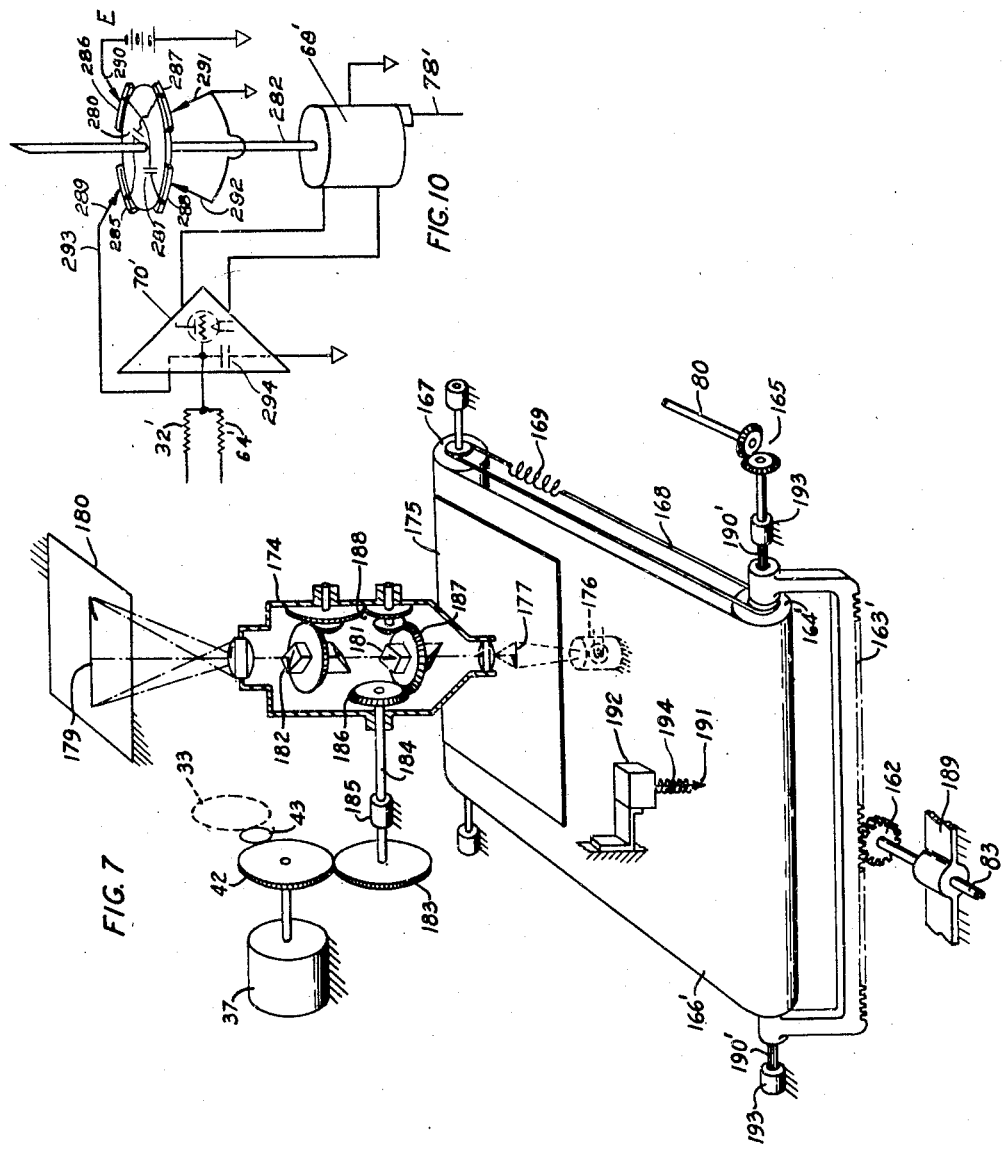
INVENTOR.
Richard Carl Dehmel July 5, 1949. R. C. DEHMEL 2,475,314
NAVIGATION APPARATUS FOR AIRCRAFT AND TRAINING DEVICES
Filed Nov. 25, 1943 5 Sheets-Sheet 4
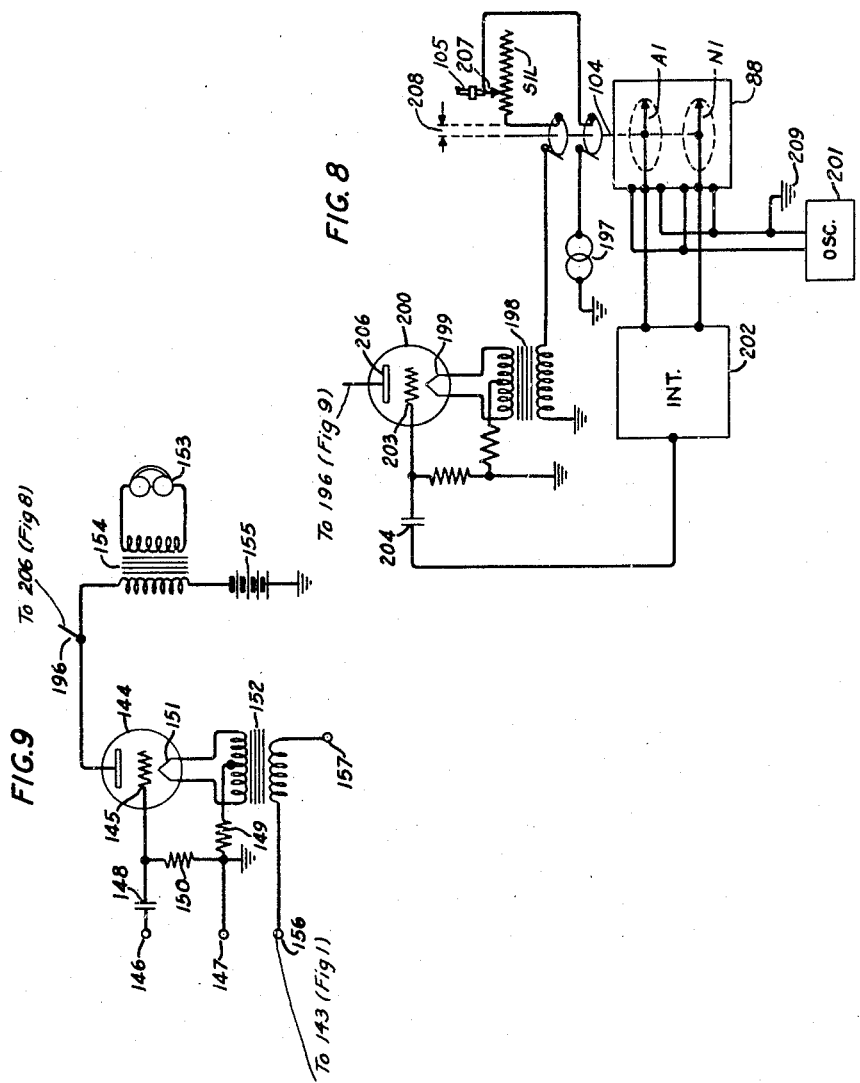
INVENTOR.
Richard Carl Dehmel

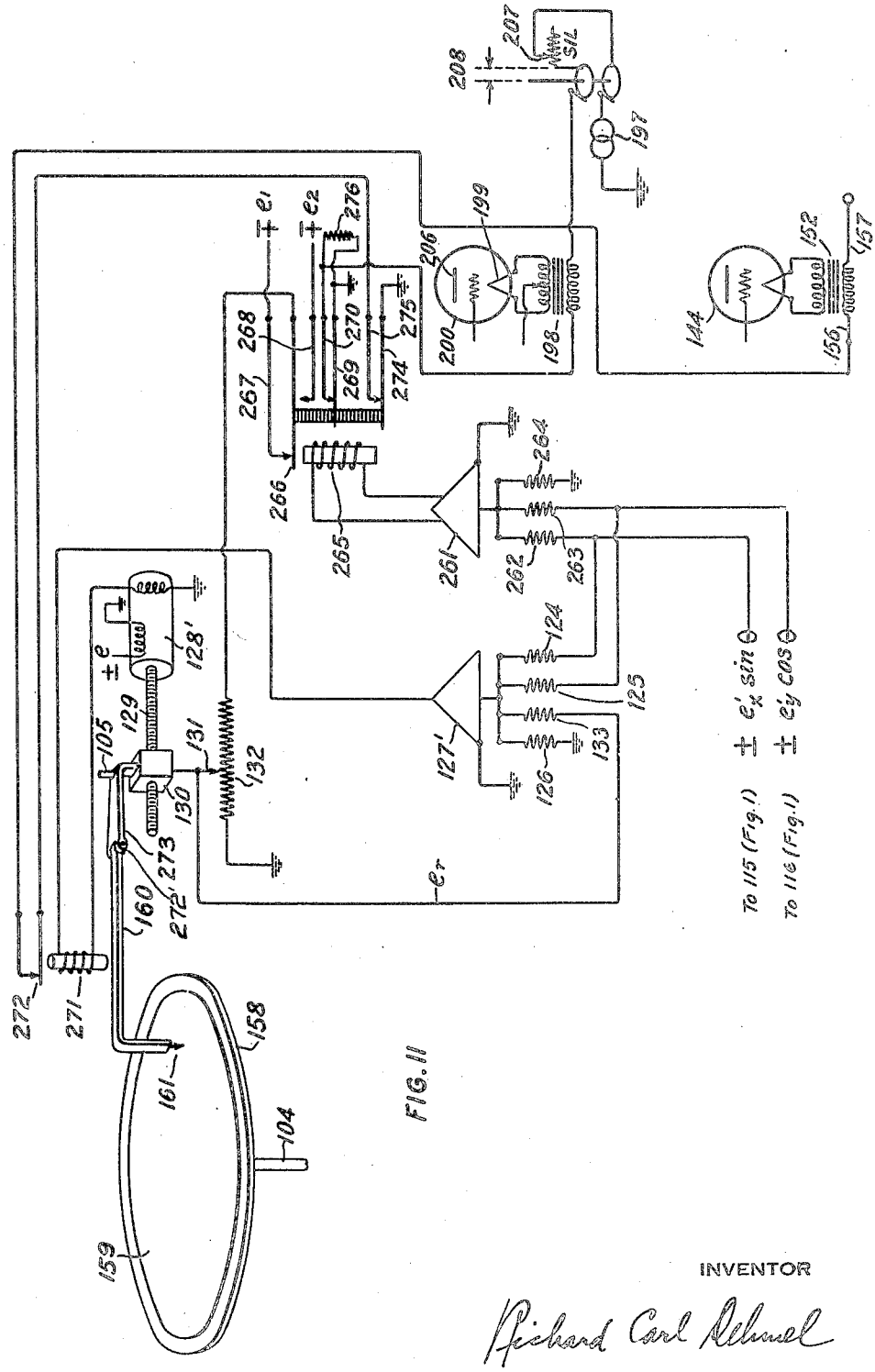

Patented July 5, 1949

2,475,314

UNITED STATES PATENT OFFICE 2,475,314

NAVIGATION APPARATUS FOR AIRCRAFT AND TRAINING DEVICES

Richard Carl Dehmel, Summit, N. J.

Application November 25, 1943, Serial No. 511,732

60 Claims. (Cl. 35—10)

This invention relates in general to navigation apparatus and is useful in charting or determining an actual or simulated path of travel of aircraft and in producing visual and audible sensory illusion of such travel. The several features of the invention and its flexibility of utilization make it ideally suited for the field of aviation; an embodiment of the invention will be described hereinafter encompassing both actual and flight navigation and navigation training including special features useful in grounded trainers.

The invention includes apparatus for use with aircraft and aviation training devices whereby signals adapted to simulate those of an airway radio system may be automatically varied in accordance with the course of the flight.

In my co-pending United States patent application S. N. 398,590 filed June 18, 1941, entitled "Method and means for aircraft flight training," I have disclosed apparatus for automatically controlling signals in an electrically operated aviation trainer. According to a feature of my prior application, the signal controller was actuated by the motion of an aircraft position indicating element which traveled on a plotting table under control of the trainee. According to another feature of said application, the effect of wind drift was introduced by mechanically displacing the indicating element and the signal controller with respect to each other.

These features made it possible to simultaneously vary the radio signals and plot the course of any flight. This combination of operations is very convenient and useful in many training procedures. There are, however, numerous instances, including the use of the apparatus for amusement purposes, where it is not necessary for the operator to have knowledge of the path which he has flown. In such instances large savings in space and equipment may be realized by operating the signal controller directly from the trainer circuits and thereby eliminating the traveling flight path indicator and its associated plotting table.

It is therefore an object of the present invention to provide an electro-mechanical circuit whereby the signal controlling elements described in my prior application may be operated directly from potentials representing the movement of an aircraft, this operation being without dependence on, or the utilization of, the motion of any flight path indicator.

An important feature of my invention resides in the usefulness of the electro-mechanical circuit, not only as a means for operating the signal controller but also as a means for operating other types of devices. For example, the circuit may alternatively be adapted to operate apparatus for optically projecting a picture of the ground or other object into view of the trainee and causing the projected picture to move in accordance with the flight path of the trainer. This optical device is fully described in my copending United States application S. N. 498,906 entitled "Aircraft navigating and training apparatus" filed August 14, 1943. In addition, the electro-mechanical circuit may be adapted to operate a charting device functioning according to either Cartesian or polar coordinates; or, it may operate both a Cartesian and a polar-type charting device conjointly.

Another feature of the invention resides in the use of the same electro-mechanical circuit for operating the optical projector and a Cartesian coordinate charting device conjointly.

Still another feature of the invention resides in the use of said electro-mechanical circuit for operating a signal controller in combination with either a Cartesian or polar-type charting device or both types of charting devices and a controller, all conjointly.

According to the last-above feature, a combination signal controller and course charting recorder may be provided in an exceptionally small space by mounting a circular chart on the shaft of the controller and a pen on the range follow-up element of the electro-mechanical circuit. This arrangement is particularly advantageous because of the compactness of the apparatus and the low cost of adding the course recorder.

Another feature of the invention is that the signal controlling and/or charting apparatus may be built as an integral component of the trainer, or the apparatus may be remotely located.

According to this feature the signal controller and/or charting apparatus may conveniently be embodied in an emplaced trainer or in a vehicular type of trainer arranged to move over the ground, such as the machines described in my Patent No. 2,366,603 granted January 2, 1945 for "Aircraft training apparatus," or it may be remotely attached to a grounded rotary-type trainer such as the well-known Link machine.

Another feature of the invention resides in the introduction of the effects of wind drift by entirely electrical means. According to this feature, a potentiometer dial is adjusted to select a potential corresponding to the speed of the wind and a second dial is adjusted to the direction angle of the wind. This second dial operates a resolver for deriving component potentials corresponding to the Cartesian vectors of the wind velocity. According to the invention, these component potentials are combined with voltages representing the Cartesian vectors of the aircraft airspeed to produce resultant voltages corresponding to the Cartesian components of aircraft ground velocity.

It is a further feature of the invention that the starting position of any problem is selected by a pair of dials adjusted to the desired Cartesian coordinates or to the latitude and longitude of said starting position.

Because of the two last-above features, it is possible to entirely enclose the charting device, the signal controller, and/or the optical projector so that no moving parts or operating members are accessible to a student. Only the wind and starting position dials appear externally and these may be adjusted by the most unskilled amateur without the risk of damaging the equipment. This is a particularly important feature in that an automatic trainer may thereby be built which has a sufficiently protected mechanism to render it satisfactory for use by the general public. The trainer may be arranged for operation as a coin-slot machine and left unattended at air fields, offices, or amusement centers without fear of damage to its mechanism.

It is another feature of the invention that the electro-mechanical circuit can be adapted to function from (a) a voltage representing the speed of the aircraft and a shaft moving in accordance with the direction of said aircraft, or (b) a pair of shafts positioned respectively in accordance with the speed and the direction of the aircraft, or, (c) two voltages representing respectively the Cartesian coordinates of the instant aircraft position.

According to the last-above feature, the signal controller and a recorder may be attached to and operated from any trainer or aircraft having speed and direction, or instant position, representations.

Another feature of the invention provides means for automatically computing and indicating the ground course and speed of a craft by vectorially combining the heading and speed of the craft through its supporting medium with the direction and speed of the medium over the ground.

It is an additional feature of the invention that the operation of the signal controller and the charting device are not affected by the attitude in which they are placed, or by accelerations.

According to this feature, the apparatus of my invention may be mounted horizontally, vertically, or inverted, and it may be subjected to extensive bumps, or other displacements without impairing its performance. Hence, the apparatus may be placed in an actual aircraft and used in the final stages of training to produce signals representing those of any selected one of a number of airways and thereby give a trainee practice in the air in the use of any radio range without flying many miles to the area of a selected range. The apparatus may also be used in actual aircraft to assist a pilot in staying on a beam during severe electrical storms and in identifying the correct leg of a multi-legged beam. A particularly useful application of the invention is the use of the charting device in actual aircraft for indicating the instant position of the craft or for recording the path flown.

Another feature of the invention is the provision of means in training apparatus for automatically operating fan and station marker signals which can be preset according to Cartesian coordinates.

A particularly useful feature of the present invention resides in operating means which surge in and fade out fan and station marker signals in a fully realistic manner, said signals being preset according to Cartesian or polar coordinates.

It is to be understood that the course charting apparatus of my invention may be used for charting the real or simulated movement of an aircraft or other conveyance in any reference plane. That is, the course charted may be the horizontal, vertical, or inclined movement of said aircraft.

An additional feature of the invention resides in means for changing the scale factor to which the course indicating and beam controlling mechanisms are operated, this change being made automatically as regions of critical importance are traversed.

These and many other features of the invention, such as new and novel features of construction and combination of parts, including electric circuits, will be more clearly understood by reference to the following text and the drawings in which commercial embodiments of the invention are shown. It is to be clear, of course, that such illustrations are primarily for purposes of disclosure and that the structures may be modified in various respects without departure from the broad spirit and scope of the invention hereinafter defined and claimed.

Parts in the specification and drawing will be identified by specific names for convenience, but these are intended to be as generic in their application to similar parts as the art will permit.

Like characters of reference indicate like parts in the several figures of the drawings of which:

Fig. 2 is a perspective view of a polar coordinate-type course charting device adapted for operation from the apparatus of Fig. 1;

Fig. 3 is a perspective view of a Cartesian coordinate-type course charting device adapted for operation from the apparatus of Fig. 1;

Fig. 4 is a circuit schematic for obtaining opposite potentials from a voltage varying device;

Fig. 5 is a circuit schematic of a rotary resolving transformer which may be used as an alternative to certain elements in Fig. 1;

Fig. 6 is a circuit schematic for a ground course and speed determining device;

Fig. 7 is a perspective view of an optical projection device adapted for operation from the apparatus of Figs. 1 and 3;

Fig. 8 is a circuit schematic for controlling signals adapted to represent those of a radio airway system;

Fig. 9 is a circuit schematic for controlling signals adapted to simulate marker beacons and the like;

Fig. 10 is a circuit schematic illustrating a condenser feedback device for motor speed control;

Fig. 11 is a circuit schematic for automatically changing the scale factor of a course charting and signal controlling mechanism.

Figure 1:
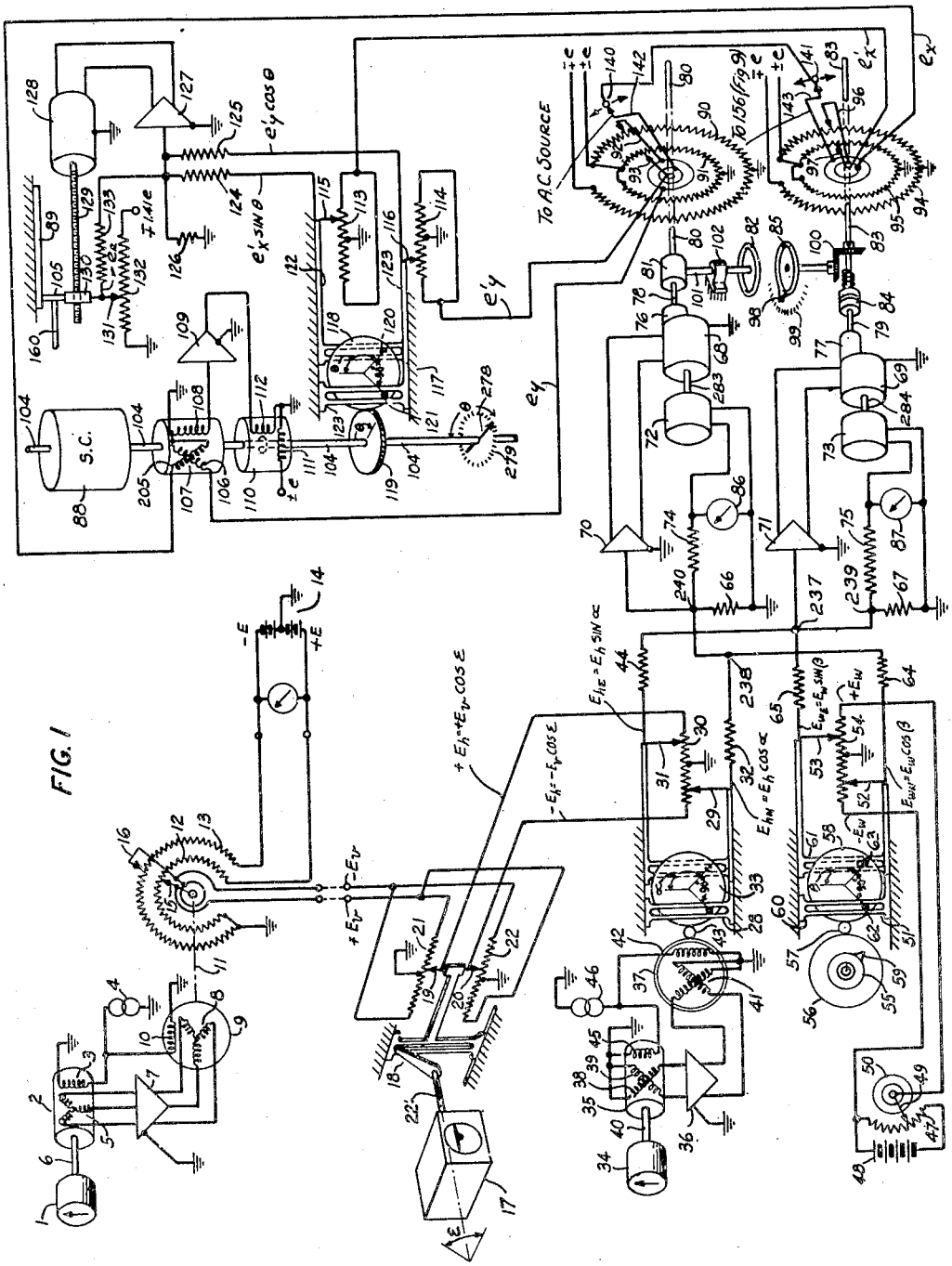
Fig. 1 is a diagrammatic view of the several parts of the electro-mechanical system, together with their electrical connections, illustrating the application of the invention to an aircraft or a trainer.

The application of the invention is not to be limited to aircraft or aviation training devices, as it may equally well be used in connection with the course charting of land vehicles, water craft, or any other conveyances or structures having actual or simulated motion and having speed and direction indicating or designating apparatus or means.

The invention may also be applied to devices wherein it is desired to remotely indicate or record the course of an object having actual or simulated motion.

The use of the invention with grounded aviation training devices is not to be limited to any particular type of trainer, as it can be adapted to use with electrically, fluid, or mechanically operated training devices which may be stationary, pivoted, or mobile.

The simulated radio beams controlled by the signal controller may be the A, N or E, T quadrature beams of a radio airway system, the conventional fan or station marker beams, a radio compass beam, or the transmitted and reflected beams of a radar located either in the conveyance or at a remote position.

Derivation of airspeed potentials

For the purposes of brevity and simplicity I will hereinafter describe my invention by referring to its application to aircraft, but it is to be clearly understood that wherever airspeed and real or simulated aircraft are referred to I intend these terms to also fully comprehend the water speed of a water craft and the application of the apparatus to real or simulated water and any other surface craft.

The apparatus of my invention requires for its operation a voltage proportional to airspeed. This voltage may be derived from the airspeed meter of the real aircraft or from a device representative of airspeed of the simulated aircraft with which the apparatus is to function. For example, the speed voltage may be derived from a generator driven from the wheels of a mobile grounded trainer or from a generator mounted in a real aircraft and driven by a propeller exposed to the air contiguous to the airplane. The voltage may be alternatively provided from a source of potential and be controlled by a suitable airspeed indicator, which term is to be understood as comprising either a device actuated by movement of the aircraft such as the usual airspeed meter, or a suitable device representing speed and actuated in accordance with simulated aircraft speed. To derive or control the voltage, a potentiometer or other voltage-varying device may be operated by the movement of the airspeed indicator if the latter has sufficient operating torque. Usually, however, the torque available from an airspeed indicator is very small and a torque amplifier, or servo-motor, is required to actuate any such voltage-varying device. One well-known form of torque amplifier is shown in the upper left corner of Fig. 1, wherein the unit 1 is an airspeed indicator, and the unit 2 is a synchronous transmitter having a primary winding 3 energized from a source of potential 4. The polyphase potentials induced in the secondary winding 5 of the transmitter are dependent on the orientation of the positioning shaft 6 of said indicator which may carry either the winding 3 or the winding 5. The potentials of winding 5 are amplified by the vacuum tube circuit 7 and are impressed on the polyphase windings 8 of the synchronous receiver 9 which has a single-phase winding 10, energized from the same power source 4 as the winding 3. The output current of amplifier 7 is maintained in constant phase and amplitude relationship with the potentials from winding 5 by the use of negative feedback in well-known manner. For any given relationship of currents in windings 8 and 10, there is only one orientation between these windings at which they will exert no rotary torque with respect to each other. Either winding 8 or the winding 10 may be attached to shaft 11 which will then assume the position of zero torque between said windings. It is in this manner that the shaft 11 of receiver 9 can be made to follow the motion of the shaft 6 of transmitter 2. Due to the amplification in power supplied by the vacuum tube circuit 7, a substantial torque may be derived from shaft 11 with small changes in the potentials of winding 5. Accordingly, voltage-varying devices such as the potentiometers 12 and 13, which require appreciable driving torque, may be operated from a delicate instrument such as the airspeed meter 1. It is to be noted that the use of vacuum tubes in amplifier 7 provides a unilateral network which completely decouples the synchro-unit 2 from potentials induced in winding by flux from winding 10 when shaft 11 is restrained or moved from its balance position.

The windings of potentiometers 12 and 13 are energized by equal and opposite potentials +E and −E respectively from source 14. The shaft 11 moves the brushes 15 and 16 on the windings 12 and 13 respectively to select potentials +Ev and −Ev from said windings corresponding to the airspeed indicated by meter 1.

In my aforesaid co-pending application S. N. 398,590, I have described an electrically operated aviation trainer having an airspeed indicator driven by an electric generator tachometer. In such a device the potential from the generator is directly proportional to the airspeed of the trainer and may be applied herein to the connection +Ev, Fig. 1. A second generator, operated conjointly with the first tachometer, but oppositely polarized, may be used to supply the potential −Ev, Fig. 1. When sources of potential, such as the generators of the referred to trainer, are directly available, the potential deriving system comprising elements 1, 2, 7, 9, 12, 13 and 14, Fig. 1, is, of course, not required. The necessity of providing the opposite polarities +Ev and −Ev will become clear as the description proceeds.

It is to be understood that the potentials E, Ev and any other velocity or position potential of the circuit may be either A. C. or D. C. and that any indications of polarity shown in the specification or drawing are instant polarities only. If alternating current is used, such opposite potentials as +Ev and −Ev may be obtained from a single voltage ±E, by means of a transformer 138, Fig. 4, having a two-section or a center-tapped winding 139.

While the apparatus of my invention is described in this specification as operating on a voltage basis, it is to be clearly understood that the system may be adapted to operate under control of any parameter of an electric current such as its potential, amperage, frequency or phase. For example, the voltage E may be modulated to a frequency which is varied in proportion to airspeed by the well known means of varying the tuning of an oscillator with a potentiometer such as 12, or by varying the capacitance of a condenser one plate of which is attached to shaft 6, Fig. 1, or by shifting phase as with a phase shifting transformer such as described in Standard Handbook for Electrical Engineers, seventh edition, 3, 213.

For the sake of diversity, the flight computing section of my invention will be described for direct current operation whereas the coordinate transforming system will be described for alternating current operation.

Throughout this specification and the accompanying drawings and claims, wherever reference is made to a potentiometer, this term is used in entirely generic sense and is intended to include any other form of voltage varying device, whether this be fractionating in character, like a potentiometer, or capable of delivering voltages higher or lower than the energizing potential, like a variable autotransformer of which the "Variac" is a widely used commercial design. Other types of voltage varying devices are also intended, such as variometers, variocouplers, variable capacitors, phase shifters, frequency modulators and the like.

Resolution of indicated airspeed to horizontal airspeed

Inasmuch as the quantity shown by the airspeed meter 1 is usually the speed in the direction of flight, it may be desirable where high accuracy in flight path recording or radio range signal regulation is required, to resolve the airspeed voltage $E_v$ to a potential $E_h$ representing airspeed along a horizontal plane. The relationship between these potentials is $E_v \cos \epsilon = E_h$, where $\epsilon$ is the angle of inclination of the flight path to the horizontal. The pitch element of the artificial horizon 17 may be used to operate the crank and slide mechanism 18 which displaces the contacts 19 and 20 cosinusoidally in accordance with the inclination angle and thereby selects the potentials $+E_h$ and $-E_h$ from potentiometers 21 and 22, respectively. These potentiometers are energized by potentials $+E_v$ and $-E_v$ as shown in Fig. 1.

The depicted crank and slide mechanism 18 in combination with the straight line potentiometers 21 and 22 is only one of numerous electrical means for performing the multiplication $E_h = E_v \cos \epsilon$. One such other means comprises a circular potentiometer having brushes functioning for the purpose of 19 and 20, Fig. 1, displaced 180 degrees on a shaft functioning as 22', Fig. 1, and in which the resistance of the circumferentially disposed winding of the potentiometer varies according to the sine of the subtended angle thereby making the potential change vary according to the cosine of said angle. The potentials $+E_v$ and $-E_v$ are applied respectively at the 0 degree and 180 degree points of the potentiometer and the ground connections are applied at the 90 degree and 270 degree positions. It will be apparent that a shaft functioning like 22' will cause brushes arranged as just described to select voltages $+E_h = +E_v \cos \epsilon$ and $-E_h = -E_v \cos \epsilon$.

Another means for performing the sine-cosine multiplication is a rotary resolving transformer such as the unit shown schematically in Fig. 5. This unit 23 is adapted for use with alternating current signals. By impressing a potential such as $E_v$ on its primary winding 24, the potential induced in one of its quadrature windings, for example winding 25, will be $E_h = E_v \cos \epsilon$, where $\epsilon$ is the angular rotation of the positioning shaft 26. The potential derived from the other quadrature winding, 27, will be $E_h = E_v \sin \epsilon$. Either the quadrature windings or the primary winding may be adapted to rotate with shaft 26.

Resolution of ground velocity potentials into Cartesian components

It is a feature of my invention that the effects of wind drift may be introduced electrically. This is accomplished by combining voltages representing the wind velocity with voltages representing the horizontal airspeed of the aircraft to produce a resultant potential corresponding to its ground speed.

To combine the wind and airspeed voltages, it is desirable to resolve these into components along Cartesian coordinate reference axes because the wind velocity is a constant parameter in this coordinate system. The reference axes may for convenience be the North-South and East-West directions, although they need not necessarily be in rectangular relationship. If the axes are mutually perpendicular and if $\alpha$ is the heading of the aircraft as measured, for example, in a clockwise direction from North, the horizontal component of airspeed voltage along the North-South axis will be $E_h \cos \alpha = E_{hN}$, and the horizontal component along the East-West axis will be $E_h \sin \alpha = E_{hE}$. These components may be obtained by a crank and slide mechanism such as 28 which moves contact 29 in cosinusoidal relationship on potentiometer 30 with respect to the direction angle $\alpha$ of the flight. In like manner contact 31 is moved in sinusoidal relationship on potentiometer 30. These potentials $E_{hN}$ and $E_{hE}$ are impressed on the summing impedances 32 and 44 respectively. The crank disc 33 of mechanism 28 is rotated in accordance with the movement of element 34 which is responsive to the heading of the aircraft. If element 34 is a compass from which little torque is available, a torque amplifier comprising the synchronous transmitter 35, amplifier 36, and the synchronous receiver 37 may be employed in like manner to the apparatus 1, 2, 7, and 9, above described. As a matter of diversity, a two-phase synchronous system is shown in the combination of apparatus 35, 36 and 37, whereas a three-phase system is illustrated in the servomotor system comprising units 1, 2, 7 and 9. The synchronous transmitter 35 operates in similar manner to the resolver 23, Fig. 5, in that a primary winding 45, Fig. 1, is energized from source 46 and induces potentials in the quadrature windings 38 and 39 which vary according to the sine and cosine of the angle $\alpha$ of the compass shaft 40. These potentials are impressed on the grid circuits of the vacuum tube amplifier 36 and the output power thereof energizes the windings 41 of the receiver 37 and thereby rotates gear 42 which engages pinion 43 and rotates the crank 33 to the angular position $\alpha$ of the shaft 40.

Wind drift potentials

Voltages $+E_w$ and $-E_w$, Fig. 1, having an amplitude representing the velocity of the wind, are derived from the potentiometer 47, Fig. 1, energized from source 48. The wiper 49 of the potentiometer 47 is adjusted according to the desired velocity of the wind by knob 50.

The wind velocities $+E_w$ and $-E_w$ are resolved into North-South and East-West Cartesian components $E_{wN}$ and $E_{wE}$ in like manner to the resolution described for the airspeed potentials. If $\beta$ is the direction of the wind with respect to North, the Cartesian components are, $E_{wN} = E_w \cos \beta$, and $E_{wE} = E_w \sin \beta$. The resolution may be accomplished by the crank and slide mechanism 51 which positions the contacts 52 and 53 on potentiometer 54 according to the cosine and sine, respectively of the wind direction angle $\beta$, in a manner similar to that above described relative to the similar mechanism 33. The wind direction is selected by the manually operated knob 55. This knob rotates gear 56, idler 57 and thereby the crank 58 to the wind direction angle $\beta$ which is indicated by an index 59, attached to knob 55. Slides 60 and 61 are respectively operated by pins 62 and 63 attached to crank disc 58.

In an aircraft or an aviation training device where means are provided for measuring wind velocity and direction, the contacts 52 and 53 of potentiometer 54 may be operated from the velocity adjustment of the measuring means, and the crank disc 58, or equivalent, may be operatively connected to the direction adjusting means.

The potentials $E_{wN}$ and $E_{wE}$ are applied to the summing resistances 64 and 65 as shown.

It will now have become clear that due to the arrangement of apparatus employed and the cyclical changes in polarity of transcendental functions, that potentiometers 21, 22, 30 and 54 must each be energized with equal and opposite voltages in order that the potentials at the moving contacts may have the proper polarity for any given angle to which the crank and slide mechanisms are set. It will, however, also be apparent that such opposite potentials are not always required in an alternating current system. They are not required when employing rotary resolvers of the type described in connection with Fig. 5.

Attention is directed to the fact that in a tandem arrangement where a power source, like 14, energizes successive potentiometers such as 12 and 13, which in turn energize additional potentiometers like 21 and 22, the impedance of any element must be low in comparison with the impedance of the next successive element if the accuracy of the final voltage resolution is to be high. In long tandem circuits the use of amplifiers between elements such as potentiometers 22 and 31 is often desirable.

As an alternative to the crank and slide mechanisms 28 and 51 and their associated straight line potentiometers, it is entirely practical to employ a circular sine-cosine potentiometer with windings having a sinusoidal resistance distribution as previously described but with brushes displaced 90 degrees to select sine and cosine potentials. In the case of an alternating current system, it will be equally practical to impress the A. C. potentials $E_h$ on the single-phase winding of a synchronous transformer having a structure similar to that of unit 23, Fig. 5. As above described, the potentials from the quadrature windings 25 and 27 of this type of rotary resolver will be proportional to the sine and cosine of the angle to which the shaft 26 is set. The potentials derived by these alternate means will correspond to the potentials obtained from movable contacts 29 and 31. In an alternating current system, a similar synchronous resolving transformer may be operated from the wind direction adjusting knob 55. In this instance an alternating current potential representing wind velocity is derived from a potentiometer such as 47, a "Variac," or other suitable voltage varying device and said potential is impressed on the single-phase winding of the resolver. The potentials obtained from the quadrature windings will correspond to those from movable contacts 52 and 53. All such resolvers in the system should be energized by currents derived from the same source of power to avoid errors due to phase differences.

Summation of the wind drift and airspeed potentials

The electro-mechanical circuit so far described has made available voltages $E_{hN}$ and $E_{wN}$, representing respectively the components of airspeed and wind along one Cartesian coordinate axis, and voltages $E_{hE}$ and $E_{wE}$, representing airspeed and wind components along a second Cartesian coordinate axis. As stated above, the sum of the component wind and aircraft speed voltages along any axis represents the velocity of the aircraft with respect to the ground along that axis. A convenient method of algebraically summing these component voltages consists of connecting said voltages to circuits having a common real or virtual impedance. The total current flow in the common impedance will be proportional to the sum of the separate voltages. A practical form of summing circuit for the potentials $E_{hN}$ and $E_{wN}$ is the combination of resistances 32, 64 and 66 wherein a voltage proportional to the resultant of $E_{hN}$ and $E_{wN}$ appears across the common resistance 66. Resistance 66 is small compared to the resistances 32 and 64. The use of a low, common coupling impedance, such as impedance 66, is advantageous in that it renders small any interaction between the circuits connected to it, such as impedances 32 and 64. The potentials $E_{hE}$ and $E_{wE}$ are similarly provided with a summing circuit comprising comparable resistances 44, 65 and 67, wherein the resistance 67 is small compared to the resistances 44 and 65. Since the potentials appearing across impedances 66 and 67 are proportional to the total velocity of the aircraft over the ground along the selected Cartesian coordinate axes, these potentials may be employed to control integrators for evaluating the time integral of the component speed along each axis and thereby the instant position of the aircraft with respect to each axis. It will be understood that in the absence of drift (i. e. zero speed of the medium to which the craft is subjected) or in the absence of relative movement of the craft with respect to such medium (as in the case of a hovering helicopter or a ship in water), the potentials used to represent the components of the craft speed relative to the ground in the respective directions of a pair of intersecting axes such as $x$ and $y$ axes will be proportional to only the speed of the craft relative to the said medium or the drift speed as the case may be. Whether one or the other or both drift and the speed relative to the medium (as air speed) are the determining factors, the potentials representing the ground speed components of the craft in the direction of the axes will be designated $x_v$ and $y_v$. These are the voltages to be separately integrated with respect to time, in the manner now to be described, and the integral values thus derived will represent the distance moved by the craft in the direction of the respective axes. For purposes of ready reference the instant position of the craft relative to said axes will be defined by coordinates $x_p$ and $y_p$.

Suitable forms of integrators comprise motors such as 68 and 69 controlled to rotate at a speed accurately proportional to the resultant potentials corresponding to $E_{hE}+E_{wE}$ and $E_{hN}+E_{wN}$, respectively. These are the potentials that would appear across the summing impedance 66 or 67 without the presence of the additional circuits formed by impedances 74 and 75, respectively, which serve the purpose later described. A convenient control means for the motor is a thermionic tube amplifier shown schematically at 70 and 71. Any one of several well-known combinations of amplifiers and motors may be used as an integrator. Inasmuch as the motors 68 and 69 must be reversible, particularly convenient types are the split-series or the two-phase designs. When the control potentials at the impedances 32, 64 and 44, 65 are direct current, it is convenient to use a modulator-summing type of amplifier as shown in Figs. 5 and 6 of my aforesaid Patent No. 2,366,603. This amplifier may be used, as shown in said application, to drive a split-series motor or it may be adapted to operate a two-phase motor by using high-vacuum tubes in push-pull combination at the output stage.

A high degree of proportionality is readily obtainable between the speed of the motor 68 or 69 and the potentials across the impedance 66 or 67 respectively by applying negative feedback to the amplifiers. For this purpose, generators 72 and 73 are driven from motors 68 and 69 respectively, as by shafts 283 and 284. These generators may be of the electric tachometer, permanent field magnet type, or of any other design in which the output potential is proportional to speed of rotation and it is preferable that the generator be compensated to avoid changes in potential with temperature or ageing. If the input control voltage at impedance 66 or 67 is alternating current, I have found it expedient to use a generator having two-phase windings, one of the phases thereof being energized by the A. C. source from which the amplifier control voltages are derived. The velocity feedback voltage from the generator is obtained from its second phase in which the induced potential is proportional to its speed.

The generator outputs are connected through high impedance elements 74 and 75 to the common impedances 66 and 67 respectively. The generators are polarized to supply voltages which are opposite to the potentials at elements 66 and 67 and thereby introduce inverse feedback around the amplifier system which, by well-known principles, causes the generators 72 and 73 to operate at speeds accurately proportional to the control potentials. Such velocity feedback integrators may be stabilized by the usual filter methods. The gain of the amplifiers 70 and 71 is high. Voltmeters 86 and 87 are connected across generators 72 and 73 to indicate the aircraft rates along the selected Cartesian coordinate axes.

My invention is not to be limited to the use of an amplifier and motor in combination with a generator as an integrating device. Satisfactory integrators may comprise relay operated motors using condenser discharge feedback, feedback from a resistance circuit closed to a source of potential for a uniform time interval during each revolution of any shaft of the integrator, or a potentiometer operated by a fly-ball governor. A watt-hour meter is also a satisfactory integrator. These and other forms of integrating devices will be apparent to those skilled in the art.

As herein used, the terms "integrate," "integrating," "integrator" and the like words pertaining to integration are used in their technical or mathematical sense. For example, my invention operates in accordance with the basic formula $$S = \int_{t1}^{t2} v \, dt$$

wherein S is the distance moved by the airplane; $v$ is the velocity; $dt$ is the differential of time and $t1$ and $t2$ represent the time limits between which the integration is to be made.

With respect to the condenser feedback method of motor control for integrator operation, Fig. 10 illustrates a convenient arrangement of this apparatus. Condensers 280 and 281 are mounted for rotation with shaft 282 which corresponds to either shaft 283 or 284 of Fig. 1. Also associated with shaft 282 and rotatable therewith are the contacts 285, 286, 287 and 288 connected to said condensers as shown. The stationary wiping contacts 289, 290, 291 and 292 cooperate with said rotating contacts to provide a switching arrangement for alternately charging a condenser from the source of potential E and then transferring said condenser to the discharge lead 293. This combination of condensers and contacts may comprise the apparatus shown as units 72 and 73, Fig. 1. It will be clear from the diagram of Fig. 10 that the polarity of the charge delivered by the condensers 280 and 281 to the discharge lead 293 will depend on the direction of rotation of the motor 68' and that the coulombs of charge delivered over said lead will be in accurate proportion to the speed of motor 68'. The pulses of current received from the rotating condensers over the discharge lead 293 are smoothed by condenser 294 which has large capacity compared to the condensers 280 or 281. The amplifier 70' may have one or more stages of amplification to produce enough gain to render the motor 68' operative with small values of potential on the summing input resistors 32' and 64' which may correspond to the combination of resistors 32 and 64 or 44 and 65, Fig. 1. The motor 68' will operate in a speed and direction such that the coulombs discharged over lead 293 equal the current received by condenser 294 from resistors 32' and 64' except for the small increment necessary to operate the motor. By increasing the gain of the amplifier 70' until the required increment is very small, a high order of precision in linearity of motor speed to input potential on resistors 32' and 64' is obtained. This linearity is a requisite for accurate integration of said input voltages by motor 68'. The output shaft 78' of motor 68' registers the value of the integral.

As has previously been stated, I do not wish to be restricted to the use of potentials such as those across impedances 66 or 67 as a means for controlling the integrators. For example, the parameter of the system may be its frequency and the integrators may be frequency-controlled synchronous motors. It is an important feature of my invention that the integrators may be controlled by any one of the various parameters of an electric current which term is to be understood as meaning potential, frequency, phase, or amperage. The term voltage is to be understood as generically meaning the electric energy in the circuit and not necessarily the potential of that energy.

The motors 68 and 69 are each provided with reduction gears 76 and 77. These reduction gears operate shafts 78 and 79, the angular movement of which is the desired time integral of the velocity components of the aircraft along the chosen Cartesian coordinate axis.

In my invention I utilize the movement of said shafts to operate potentiometers from which voltages are derived whose potentials are proportional to the respective instant Cartesian coordinates of the aircraft. These position potentials are used for actuating the automatic signal controller comprising the azimuth unit 88 and the range unit 89, Fig. 1, in the manner now more particularly to be described.

The North-South Cartesian coordinate potentiometer 90 is energized from a source providing the alternating current voltages $\pm e$ and $\mp e$, and the potentiometer 91 is energized by the voltage $\pm e$. Brushes 92 and 93 cooperate with the potentiometers and are moved by the brush shaft 80 driven from motor shaft 78 through the differential gear 81. The drag band 102 on differential input shaft 101 prevents rotation of handwheel 82 by torque from shaft 78.

In like manner, the East-West Cartesian coordinate potentiometers 94 and 95 are energized by the same voltage source and have brushes 96 and 97 respectively, said brushes being moved by the brush shaft 83 driven from motor shaft 79 through the friction drive 84. This friction drive is shown as an alternative means to a differential such as 81 for adjusting the position of the potentiometer brushes, by means of the hand wheel 85 operatively connected to the shaft 83 by means such as the bevel gears 100.

The purpose of the differential 81 and the friction clutch 84 is to permit adjusting the position of the Cartesian potentiometer brushes without operating the motors 68 or 69.

*Selection of starting position of flight*

It is a feature of my invention that the starting position of the flight or training problem may be selected by operating two handwheels, namely 82 and 85, for by such arrangement, any student or operator, regardless of how unskilled he may be, can set up his problem without the slightest danger of damage to the equipment. There is no delicate apparatus to be manipulated on a table. There are only two handwheels, 82 and 85, and these can be rotated as vigorously as desired without stressing any apparatus. The position-selecting handwheels, together with the wind adjustment knobs 50 and 55, are the only elements of the entire mechanism which are exposed to a student or operator for manipulation.

Whether differentials or friction clutches are employed is dependent on the application of the signal controlling circuit. If it is to be used in connection with an actual aircraft as described above, the friction clutches are preferable to a differential because a handwheel such as 85 may be connected by bevel gearing such as 100 to a brush shaft 83 which drives brushes such as 96 and 97. The handwheel and brushes will then always move together and by equipping said handwheel with an index 98, which registers on dial 99, the latitude (or longitude) of the aircraft may be noted. If, on the other hand, the signal controlling apparatus is to be used with an aircraft flight trainer and the student is to start the problem at an unknown location, a differential gear such as 81 is preferable because its handwheel 82 will have a different position for any orientation of a brush shaft such as 80 with each new position of the motor shaft 78. Hence, when a student turns a differential gear handwheel such as 82, he will set the apparatus to a random instant position for the aircraft. This makes it impossible for him to have any prior knowledge of his position at the start of the problem and he must therefore find his location by the standard radio range orientation procedures which he is to practise.

*Signal controller positioning circuit*

A convenient form of signal controller for use with my invention herein described is the device disclosed in my aforesaid co-pending application S. N. 398,590. This controller comprises two electrically interconnected attenuating mechanisms the first of which is operated according to the azimuthal direction of the aircraft from the transmitting radio station and the second of which is actuated in accordance with the distance, or range, of the aircraft from said range station. The azimuthal mechanism is shown as unit 88 in Fig. 1, of the present application and its azimuth positioning shaft is depicted as element 104 which corresponds to shaft 102, Fig. 12 of my aforesaid application S. N. 398,590. The distance or range mechanism is shown at 89, Fig. 1, herein and has an operating connection 105, which corresponds to pin 29 shown in Figs. 15 and 23 of said co-pending application.

Other forms of signal controller are shown in my abandoned application, S. N. 501,009, entitled "Automatic signal controlling apparatus for aircraft training devices," filed September 2, 1943. In these embodiments the scanned elements may be traversed by the scanning element according to any suitable coordinate movement which coordinates may be velocity and direction, Cartesian, or polar coordinates. If the polar system is employed, the scanned elements are rotated in azimuth, the center of rotation being at the radio station and the scanning element is adjusted with respect to the said scanned element in accordance with the range of the aircraft from the radio station.

Each of the above referred to signal controllers is actuated in azimuth and range by potentials selected by potentiometer brushes 92, 93, 96 and 97. This actuation requires the transformation from Cartesian to polar coordinates which is accomplished as follows.

*Coordinate converter*

The centers of the windings of the potentiometers 90, 91, 94 and 95 occur where shown grounded in Fig. 1 and represent the origin, or intersection, of the Cartesian coordinate axes. The windings have a linear voltage distribution with angle and therefore, the voltages, designated $e_y$ and $e_x$, appearing on the movable brushes 92 and 96, respectively, represent the distances $y_p$ and $x_p$ of the aircraft along the North-South (or "$y$") and East-West (or "$x$") axes from the origin, respectively in either the positive or negative sense.

To orient the azimuth shaft 104, Fig. 1, the voltages $e_x$ and $e_y$ may be impressed on the quadrature windings 205 and 106 of the rotary synchronous transformer 107 which can be employed according to either of two methods to rotate said shaft. The first of these methods utilizes the transformer as a synchronous receiver in which the primary winding 108 is energized from the same source of potential as that supplying the voltage $\pm e$ to potentiometers 90 and 94. According to this method, the windings 205 and 106 will rotate with respect to winding 108 until an equilibrium position is reached between their fluxes. Either the windings 205 and 106, or the winding 108 may be attached to the shaft 104. The position of flux equilibrium between the windings corresponds to the polar azimuth angle $\theta$ subtended between the aircraft and the radio station. It is to be noted that:

$$\theta = \tan^{-1} \frac{e_x}{e_y}$$

Pointer 278 may be attached to shaft 104 to indicate on the scale 279 the azimuth angle $\theta$ between the center of the coordinate system and the craft.

According to the second method of utilizing the rotary transformer 107 to position shaft 104 to the angle $\theta$, the primary winding 108 is used as an input coil to the amplifier 109. In this application the transformer may be similar to the model 787–01 rotatable transformer manufactured by the Kollsman Instrument Company. For any given values of $e_y$ and $e_x$ there will be a position of shaft 104 at which no voltage will be induced in winding 108. This position is the angle $\theta$. Any small deviation to the right or left from this position will cause the induction of an in-phase or out-of-phase potential in winding 108. This is impressed on the input of amplifier 109 whose output is connected to a winding 112 of the two-phase motor 110. Phase 111 of this motor is energized from the same source as the potentiometers 90 and 94. The winding 112 is so polarized that motor 110 operates in the direction to reduce the potential from winding 108 and thereby bring the shaft 104 to the angle $\theta$. This servo-motor system is stabilized against oscillation by the inclusion of suitable filter networks in the amplifier 109 according to well-known principles. In practice, this latter use of the transformer 107 is the preferred method for positioning shaft 104 because negligible power is required from the unit 107, the work of moving shaft 104 being done by the motor 110. If appreciable power is used at the transformer 107, the potentiometers 90 and 94 should be replaced by continuously adjustable autotransformers.

To position the range element 105 with respect to the range unit 89, potentials designated $e'_y$ and $e'_x$ are derived from potentiometers 91 and 95 energized by a voltage $\pm e$. This potential may be either alternating or direct current, and it is to be noted that the same polarity is applied to the ends of the potentiometer representing negative coordinates as to the positive extremity. This is because the range always has a positive value from the radio station. While according to the present embodiment of the invention the numerical values of $e_y$ and $e'_y$ are the same and the numerical values of $e_x$ and $e'_x$ are the same, it will be understood by those skilled in the art that different scale factors may be used if desired. The potentials representing the distances outwardly from the intersection of the respective $x$ and $y$ axes will be designated $E_x$ and $E_y$ respectively.

It will be evident that if the voltage corresponding to the range is designated $e_r$, then $e_r$ is the sum of the numerical values $e'_y \cos\theta$ and $e'_x \sin\theta$. To derive the value of $e_r$ the potentials $e'_y$ and $e'_x$ are applied respectively to potentiometers 113 and 114 on which sliders 115 and 116 move in cosinusoidal and sinusoidal motion, respectively. These motions are imparted by the crank and slide mechanism 117, wherein the crank disc 118 is rotated by gear 119 with rotation of shaft 104. Connecting pins 120 and 121 operate sliders 122 and 123, respectively, to which are attached contacts 115 and 116. Contacts 115 and 116 together with their connecting circuits are insulated from the slider mechanism 122 and 123. The potentials $e'_x \sin\theta$ and $e'_y \cos\theta$ are summed to obtain a potential $e_r$ representing range by respectively impressing said potentials on impedances 124 and 125 which are high compared to impedance 126. The potential appearing across impedance 126 is impressed on amplifier 127, which may be of the type described in my aforesaid Patent No. 2,366,603. The output of amplifier 127 drives motor 128 which operates the lead screw 129 cooperating with the nut 130 to move the range element 105 which actuates the range mechanism 89. In the embodiment shown in Fig. 1, the range mechanism 89 does not rotate in azimuth as in the structure disclosed in my prior application S. N. 398,590, Figs. 12, 13, and 21. It may, however, be made to so rotate by mounting the entire range mechanism 89, including the range motor 128, screw 129, nut 130, potentiometer 132, wiper 131, and the necessary slip rings for completion of electrical connections, on shaft 104 of the azimuth unit. The range mechanism 89, Fig. 1, herein, may embody all visual and audible fan and station marker controls, the radio range distance control, and the glide and localizer beam controls which form a part of the structures shown in my co-pending application S. N. 398,590, or in my aforesaid Patent No. 2,366,603.

Also attached to range element 105 is a contact 131. This contact and its connecting circuit is insulated from nut 130. Contact 131 cooperates with potentiometer 132 which is energized by a voltage opposite to that impressed on windings 91 and 95 and equal to $\sqrt{2}$ times the winding voltage. The potential from contact 131 is impressed on impedance 133 and is algebraically summed with the potentials on impedances 124 and 125. The motor 128 is so polarized that the voltage on impedance 126 operates amplifier 127 to drive motor 128 in such direction as to decrease said voltage. If impedances 124, 125, and 133 are all equal, then the motor 128 will move the range element 105 until $e_r = e'_x \sin\theta - e'_y \cos\theta$, at which point the element 105 has moved along unit 89 to the distance of the aircraft from the radio range station. The range motor 128 is deenergized at this point of balance by the null-voltage control above described.

If the impedances 124, 125, and 133 are not in unity ratio to each other, the energizing potentials on potentiometers 113, 114, and 132 must be modified to be in corresponding ratio.

*Control of fan and station markers from Cartesian coordinate integrators*

In addition to operating fan and station markers from a signal controller responsive to the coordinate converter above described, I have invented novel means whereby visual and/or audible fan and station marker signals may be operated by elements moving according to the Cartesian coordinates of an aircraft or trainer in flight.

For this purpose, contacts such as 140 and 141, Fig. 1, are radially disposed with respect to the Cartesian coordinate shafts 80 and 83 and are circumferentially adjustable to the respective latitude and longitude which the marker is to occupy on the radio range. Brushes 142 and 143, driven respectively by shafts 80 and 83 close an electrical path to a marker signal circuit when both brushes simultaneously engage their contacts. In Fig. 21 of my aforesaid patent, I have shown a circuit for operating either audible or visual marker signals. This circuit may be employed with my present invention by substituting for contacts 254 and 260 of said Fig. 21, the contacts 140 and 141 of Fig. 1, herein, and further substituting for contacts 259 and 262 of said Fig. 21, the brushes 142 and 143 of Fig. 1, herein.

Other contacts such as 255, 256, 257, 274, 275 and 276, of said Fig. 21, may be added around shafts 80 and 83, Fig. 1, herein, if desired.

*Marker signal surge control circuit*

An improved marker signal tone circuit which is an important embodiment of my invention is shown in Fig. 9 herein and comprises a vacuum tube 144, having a grid 145, which receives continuous or interrupted tone from an oscillator of any standard design connected to terminals 146 and 147. The frequency of the tone and its interruptions represent the signals transmitted by the simulated marker station. The function of condenser 148, Fig. 9, is to block any direct current applied to terminals 146 and 147. Element 149 is a cathode bias resistance and element 150 is a grid resistance. When filament 151 is heated from current received through transformer 152, the tone signal on terminals 146 and 147 is transmitted to the pilot's receiver 153 through the plate circuit of vacuum tube 144 comprising the coupling transformer 154 and the battery 155.

When a fan or station marker is passed in actual flight, the signals received by a pilot surge in and fade out at a rate and at an intensity dependent on the speed of the aircraft and the proximity of the aircraft to the marker transmitter. If the edge of the marker beam is grazed, the tone fades in and out quickly and at low intensity; whereas, if the flight is directly through the center of the beam, the signals persist longer and are louder. Much work has been done to automatically simulate these characteristics in aviation training devices but so far as I am aware no practical solution to the problem has heretofore been devised. By the novel application of a simple filament control circuit I have accomplished a particularly effective solution to this formely difficult problem.

When a unit function current is impressed on the filament of a vacuum tube, its temperature and electronic emissivity rise exponentially to an asymptotic value and they decay similarly when the filament current is removed. By appropriately choosing the thermal capacity, emissivity and other characteristics of the filament, any desired rate and magnitude of plate current rise and decay can be obtained with simple closure and opening of the supply current to the filament. By utilizing this behavior of a vacuum tube I have provided fan and station marker signals and the like, which surge in and fade out in entirely realistic manner and in accordance with the time that the aircraft is in contact with the beam. In my novel combination of apparatus the brush 142, Fig. 1, is connected to a source of alternating current power; the contacts 140 and 141 are connected together and the brush 143 is connected to terminal 156, Fig. 9. Terminal 157, Fig. 9, is the return connection to the source of power. When the brushes 142 and 143 simultaneously engage their respective contacts 140 and 141, a power circuit is closed to transformer 152 (see Fig. 9) and the filament of the vacuum tube 144 is energized. The size of the contacts, including the width of the brushes, determines the size of the vertically radiated marker beam. If the flight of the aircraft is such that the edge of the marker beam is just grazed, the shafts 80 and 83 will move through such positions that the brushes 142 and 143 will just graze the contacts 140 and/or 141. Accordingly, the circuit to the filament transformer 152 will be closed only momentarily, and the filament 151, Fig. 9, will be heated only partially and for a relatively brief time. As a result, there will be only a small, short rise in plate current, and the pilot will receive only a brief, weak signal. If, however, the aircraft passes directly over the beam, the brushes 142 and 143 will remain on contacts 140 and 141 relatively long and the filament will heat to a much higher temperature and produce a louder and longer signal to the pilot. Hence, by the use of very simple contacts, I am able to simulate the complicated variations in fan and station marker signals which have heretofore been manually controlled by skilled operators using attenuators of cumbersome and costly design.

It is not essential that the contacts 140 and 141 be of high quality as is the case with contacts used in adjustable attenuators employed in oscillator or plate current channels. In my apparatus, the effects of current irregularities due to poor contacts in the control circuit are absorbed by the thermal delay in the filament. This is a feature which substantially reduces maintenance effort.

The thermionic device of Fig. 9 has been described above as operating from make and break switching contacts to smoothly fade in and out signals adapted to simulate fan marker beams. This device is also useful as a control means for regulating the volume of various other kinds of signals. For example, in my said co-pending application S. N. 398,590, there is described a signal controller for varying the quadrature (A, N or E, T) signals of a radio range station by means of a pair of azimuth attenuators A1 and N1, Figs. 20 and 12, and a range attenuator SIL, Figs. 13, 21, and 22. The range attenuator SIL is disclosed in said prior application as being a variable series resistance engaged by a wiper. In this apparatus the wiper varies the signal intensity in discrete steps as it moves from turn to turn along the resistance winding and then abruptly disconnects the signal at the region of the "Cone of Silence" where the contact leaves the end of said winding. Such abrupt changes in signal strength are undesirable and may be avoided by the circuit shown in Fig. 8 of the present application, wherein the resistor SIL is used to regulate the current from source 197 to transformer 198 and thereby the temperature and emission of filament 199 of vacuum tube 200. Oscillator 201 energizes the attenuators A1 and N1 in the azimuth mechanism 88, which corresponds to the like-numbered unit of Fig. 1. Interrupter 202 keys the signals from unit 88 to represent those of the simulated radio range and the output of the interrupter actuates the grid 203 through the isolating condenser 204. The output circuit of the device of Fig. 8 may be completed through a common receiver such as 153, Fig. 9, by connecting the plate 206, Fig. 8 to the common connection 196, Fig. 9. A plurality of thermionic signal smoothing devices may in this manner be connected to a common receiver, each device being separately controlled by independently energizing the cathode thereof from a switching circuit which, in the case of Fig. 8, is the resistor SIL and contact 207, the latter being operated by the range element 105 of Fig. 1.

The resistor SIL is terminated a short distance 208 from the point representing the center of the radio range station to form a Cone of Silence. The operation is as follows: Contact 207 leaves resistor SIL in the immediate proximity of the radio station and thereby opens the filament supply of tube 200 which fades out the signal to receiver 153, Fig. 9. As shaft 104 rotates and the aircraft again increases its range from the station, contact 207 re-establishes a connection with resistor SIL and the filament is re-energized to smoothly surge back the signal volume. Small discrete step increments in filament current control do not cause sudden changes in the plate current or signal from tube 200 because of the thermal inertia of filament 199.

A type of vacuum tube which I have found to be suitable for controlling the rise and decay of the signals is the R. C. A. thermionic tube type 6A4. If I wish to have a controlling vacuum tube which provides a faster rise and decay rate, I would use a tube having a directly heated cathode of small current rating such as the 3Q5–GT. By varying the filament diameter and the heat capacity or thermal inertia of the tube, the rise and decay rate of the signal can be changed.

Use of polar coordinate circuit for flight path recording

Although the electro-mechanical circuit hereinbefore described is a most effective means for operating a signal controller for automatically varying signals adapted to represent those of an airway radio range, the circuit is by no means limited to such application. In fact, instead of using the shaft 104, Fig. 1, to drive the signal controller azimuth unit 88, Fig. 1, said shaft may be equipped with a disc 158, Fig. 2, to which is secured a chart 159; and instead of using the member 105, Fig. 1, to drive the signal controller range mechanism 89, said member may be fitted with a charting arm 160, Fig. 1, of which the extremity is shown in Fig. 2. At the extremity of arm 160 is attached a course indicating stylus 161, or alternatively a course recording pen. Inasmuch as the disc 158 will continually be moved to the instant azimuthal direction of the aircraft from the axis of the axis of the shaft 104, and since the stylus 161 will be continually positioned away from said axis in accordance with the instant range of the aircraft from the point represented by said axis, the described combination of apparatus will continually indicate or plot the path flown by the aircraft.

As an alternative to the above arrangement, the disc 158 and chart 159 may be fixed in a stationary position, and arm 160, including motor 128, Fig. 1, screw 129, nut 130, contact 131, potentiometer 132, and the necessary slip-rings for completion of the electric circuits, may be mounted for rotation on shaft 104.

It will be noted that since the range values are always positive, the pen operates along radii between the chart periphery and its center and that in the event the flight continues past the radio range station; i. e., center of chart; the chart motor is unbalanced so as to rotate through a half revolution and thereby enable the pen to trace a continuous flight past the station, such operation being inherent in the apparatus herein disclosed. Referring specifically to Figs. 1 and 11 and assuming that the pen is tracing a course that goes over the radio station, there will be a slight over-travel of the pen past the center of the chart after the contacts of the X and Y integrators 94 and 90, Fig. 1, pass the zero grounded positions. Prior to this when the pen is approaching the chart center, the azimuth control voltages $+e_x$ and $-e_y$ tend to remain equal since any unbalance will cause rotation of the chart in a direction to equalize the voltages. However, after the chart center has been passed the system is in a state of unstable equilibrium and the unbalance voltage will cause rotation of the chart in a direction to increase, instead of decrease, the unbalance. After rotating 180° the chart again reaches a position of stable equilibrium.

The balanced and unbalanced conditions may be explained as follows: The criteria for balance of the azimuth servo 110 is $y \sin \theta - x \cos \theta = 0$. This relation exists when $$\frac{y}{x} = \frac{\cos \theta}{\sin \theta}$$

these ratios being a constant for straight line travel of the aircraft toward the radio station or origin point. If now it be assumed that the origin is approached in straight line flight from the northeast quadrant, the values of $x$ and $y$ will both be positive, but the azimuth servo has positioned the chart so that the value $$(y \sin \theta - x \cos \theta)$$

equals zero. In this balanced condition consider a slight displacement, $+\Delta y$, in the north direction for example. This will cause an unbalance in the equation and a resulting positive polarity voltage output from the azimuth motor amplifier 109 for energizing the azimuth motor 110. The motor is polarized so that a positive unbalance causes it to operate the resolvers conjointly with the chart in a direction and through an angular increment $-\Delta\theta$ so as to minimize the unbalance. Accordingly in this instance the motor will rotate minimizing the unbalance until the new position of balance is reached.

If the simulated radio guided flight of the aircraft continues directly through the origin point into the southwest quadrant, there will be a change in sign of both the $x$ and $y$ components, but the value of $(y \sin \theta - x \cos \theta)$ will still equal zero. Therefore as long as this precise condition holds, there will be no rotation of the motor upon passing the origin. However, after so passing the origin an unstable equilibrium condition exists and the slightest disturbance to the system will cause as presently pointed out a 180° chart reversal. To illustrate, consider now that a small deviation or displacement $\Delta y$ has occurred again in the north direction. It will be seen that the amplifier output will again have positive polarity and tend to rotate the motor 110 in the same direction $-\Delta\theta$. This will decrease the value of the term $-y \sin \theta$ but will increase the value of term $-(-x \cos \theta)$. Accordingly, the output voltage of amplifier 109 will have a still greater positive polarity, tending to rotate motor 110 in a further $-\Delta\theta$ direction until this rotation has exceeded 90° when further rotation of the motor will cause a reversal of the polarity of the $\cos \theta$ term and therefore tend to reduce the voltage applied to the motor as the stable equilibrium point is attained.

The reversal of the range or pen motor 128 takes place substantially concurrently with reversal of the azimuth motor according to the same general theory. The inputs to the motor 128 include the balancing range voltage from potentiometer 132 and voltages from potentiometers 113 and 114 representing $x \sin \theta$ and $y \cos \theta$ respectively, according to the relationship $$e_r = e_x \sin \theta + e_y \cos \theta$$

The motor 128 is polarized as previously pointed out and as diagrammatically illustrated in Fig. 11 so as to decrease any existing unbalance between these terms. Although a continuation of the flight past the origin results in reversal of the polarity of the values $x \sin \theta$ and $y \cos \theta$, the range values are maintained positive by another reversal of polarity of the derived voltages from the potentiometers 113 and 114 by means of the 180° chart rotation above described. Thus, a double reversal of polarity keeps positive the voltage represented by the above equation $$e_r = e_x \sin \theta + e_y \cos \theta$$

so that the range motor again seeks positive range values until the value of the derived voltage from potentiometer 132 representing $-e_r$ equals the summed positive values of $x \sin \theta + y \cos \theta$.

*Combination signal controller and course charting device*

A particularly effective feature of my invention resides in the simple manner in which both a signal controlling device and a course charting device may be conjointly operated. Each device is actuated directly from the same operating elements. According to this feature, the azimuth mechanism 88 of the signal controller is driven by shaft 104 to which is also attached the disc 158 which carries chart 159. This attachment may be made at either extremity of shaft 104. The range mechanism 89 of the signal controller is driven by the member 105 which conjointly carries the charting arm 160, Figs. 1 and 2.

This combination of apparatus results in an exceedingly compact mechanism for performing the composite function of signal controlling and charting.

*Use of Cartesian coordinate circuit flight path recording*

Since the shafts 80 and 83, Fig. 1, rotate in accordance with the Cartesian coordinates of the instant aircraft position, this position may be continuously recorded by extending said shafts to the mechanism shown in Fig. 3, wherein shaft 83 operates pinion 162 to move rack 163 according to the instant longitude of the aircraft and wherein shaft 80 rotates cylinder 164 through bevel gears 165 to move chart 166 wrapped on cylinder 164 in accordance with the instant latitude of said aircraft. Cylinder 167 driven by cord 168 feeds or re-rolls chart 166 with rotation of cylinder 164. Spring 169 removes slack from the cord 168. Attached to rack 163 is the charting arm 170, to which is attached the flight path indicating stylus 171 which may alternatively be a recording pen.

It is to be noted that the handwheels 82 and 85, Fig. 1, may be used to select the starting position of the stylus 171, Fig. 3, in the same manner that they are used to position the Cartesian coordinate potentiometers 90, 91, 94, and 95.

A very useful feature of the course charting device of Fig. 3 resides in the exceptionally long map which may be placed on cylinders 164 and 167, thereby making possible the continuous recording of flights of unusual length, including endurance training flights.

In the described apparatus, the longest length of flight can be made in the direction of paper travel corresponding to rotation of the cylinder 164, Fig. 3, which, according to the arrangement shown, is the North-South direction. To adapt the recorder of Fig. 3 to the charting of long flights in any direction, I have provided phase displacing means whereby the rotation of cylinder 164 can be made to correspond to any desired compass heading. For this purpose the shaft 40, Fig. 1, may be interrupted and a differential gear inserted between the compass 34 and the synchronous transmitter 35 whereby to modify the orientation of the transmitter shaft with respect to the compass shaft by any desired angle and to thus rotate the Cartesian coordinate axes through that angle. By shifting the wind direction index 59 through the same angle with respect to the gear 56, the wind axes are made to conform to the direction of the airspeed axes. Thus, the Cartesian coordinate recorder is conveniently adapted to charting long transcontinental or transoceanic cruises or training problems.

*Means for changing scale factor on the course indicating and signal controlling mechanism*

During the travel of an air or surface craft the operator thereof is frequently more interested in certain parts of its course than he is in other parts. It is, therefore, often desirable to expand the scale of the course indicating map in certain regions and to similarly increase the scale of any signal controlling apparatus used to simulate the radio beams in critical or congested areas. For example, when practicing radio beam orientation procedures, the area of particular interest is that which extends to a radius of twenty-five miles from the center of the radio station. This area is important as it includes the cone of silence and substantially all such radio beams as markers, glide and localizer beams. While the region beyond the twenty-five mile radius is of lesser interest, it is necessary to extend the coverage of the course indicating device and signal controller to as much as several hundred miles.

A convenient form of signal controller is that represented by the units 88 and 89 in Figure 1 of this application. The mechanism of these units is described in detail in my above referred to co-pending application, Serial No. 398,590.

To avoid congestion and too close spacing of contacts in unit 89, or the use of a very large chart 159, Fig. 2, I have devised means comprising the novel combination of apparatus shown in Fig. 11 for automatically changing the scale factor of the mechanism as the range of the craft, represented by the position of element 105, Fig. 11, becomes less than any predetermined value. The operation of the apparatus may be noted by further reference to Fig. 11, in which amplifier 261 is controlled by potentials received from brushes 115 and 116 of Fig. 1. These potentials are $\pm e'_x \sin \theta$ and $\pm e'_y \cos \theta$. The algebraic resultant of said potentials is $\pm e'_R$ which is proportional to the range of the craft from the origin of the reference polar coordinate system. This resultant is obtained by means of the summing network comprising the input impedances 262, 263, and the low common impedance 264. This network functions in the manner previously described for the summing networks of amplifiers 70 and 71, Fig. 1. When the range of the craft and thereby the voltage $e'_R$ exceeds the predetermined value, which is adjustable by varying the gain of the amplifier 261, by any suitable well known means, the output current of amplifier 261 operates relay 265 and thereby transfers spring 266 from contact 267 to contact 268 and changes the voltage impressed on the range potentiometer 132 from $\mp e_1$ to $\mp e_2$. The ratio $$\frac{e_1}{e_2}$$

determines the change in the scale factor and thereby the movement of the range member 130 for any given movement of the craft. In turn, the rate of travel of the element 105 which operates the signal controller range unit 89, Fig. 1, and the pen 161, Figs. 2 and 11, is varied according to $$\frac{e_1}{e_2}$$

The scale factor may also be changed by switching a shunting resistance across resistance 264 by means of contacts on relay 265. Alternatively, the value of resistance 264 may be varied by using relay 265 to insert a resistance in series with resistor 264.

Inasmuch as the range element 105 operates the range unit 89, Fig. 1, of the signal controller on either scale factor setting, it is necessary to disable certain circuits of the range unit during operation on one scale factor and to reestablish these circuits when operating on another scale factor. This switching is required to avoid double operation of the signals on the two different scales. Examples of circuits requiring such switching are those controlling the marker signals and the landing beam signals. Referring to Fig. 11, when the relay 265 is operated by the application of a high range voltage $e'_R$ to the amplifier 261, the spring contact 266 of relay 265 is depressed and operates contact 274 away from contact 275 and thereby opens the energizing circuit to vacuum tube 144 through transformer 152. This tube and transformer are the same as the like numbered elements of Figure 9, the operation of which has previously been described. Since vacuum tube 144 controls fan marker signals, these are rendered inoperative when large range signals are impressed on amplifier 261 which is the condition of operation of the apparatus on small scale factors.

To obviate any change in the loudness of the A and N radio beam signal volume with changes in scale factor with the aircraft at a given radial distance from the transmitting station, spring 269 and contact 270 are operated by relay 265 to introduce resistance 276 into the energizing circuit of vacuum tube 200. This insertion of resistance 276 avoids a change in signal volume which would otherwise be caused by the movement of slider 207 by the abrupt change in the position of range element 105, Fig. 8, with a change in scale factor.

A further feature of the circuit of Fig. 11 resides in means for rendering the pen 161 and the signal controller elements 89, Figs. 1 and 8, inoperative while the circuit is making the transition from one scale factor to another, or at any time that the range servo-motor 128' is not accurately balancing the range voltage applied to impedances 124 and 125, which is proportional to $(\pm e'_x \sin\theta) + (\pm e'_y \cos\theta)$. This feature prevents false indications or recordings on the chart 159 and it likewise prevents the transmission of false radio beam signals to the trainee.

It is to be noted that so long as the two-phase reversible servo-motor 18' is accurately positioning the brush 131 on potentiometer 132, there will be very little output current from amplifier 127' because the voltage $e_R$ derived from potentiometer 132 will then balance the voltage $\pm e'_x \sin\theta$ and $\pm e'_y \cos\theta$ derived from brushes 115 and 116, respectively, Fig. 1. This operation has been described in detail in preceding paragraphs. If the motor 128' does not move slider 131 with sufficient speed to fully balance the voltages from brushes 115 and 116, Fig. 1, there will be a large current output from amplifier 127'. Such a condition of large unbalance occurs at the time when amplifier 261 causes relay 265 to operate and suddenly change the voltage on potentiometer 132 from $\mp e_1$ to $\mp e_2$ or vice versa. With the application of such a transient to the system the amplifier 127' will deliver a heavy output current through relay 271 which causes this relay to operate and open contacts 272. These contacts hold open the circuit to vacuum tube 144 and thereby prevent introduction of radio range signals during the period when the range element 105 traverses between positions representing the change in scale factor. Contacts similar to 272 may be used to disable any other signaling circuit during the time of slewing between scale factors.

The fixed core of relay 271 also exerts an attractive force on arm 160 of the course indicating device. This arm is pivoted at joint 272' and, when magnetically attracted by the relay core 271, lifts the indicator or pen 161 from chart 159. False indications or registrations of the course are thus prevented during the slewing period when the scale factor changes and at any other time when brush 131 is not accurately positioned for range.

It is not necessary to use a pen for the recording element shown as 161 in Figs. 2 and 11. A very satisfactory alternative arrangement is a high tension electrode, insulated from the arm 160 and energized by a source of high potential to cause a spark to pass from said electrode, through the recording paper 159, Fig. 2, to the grounded metal plate 158, Fig. 1. The passage of the spark marks the map 159 by discoloration or perforation. Contacts similar to 272, Fig. 11, may be added to relay 271 to open the energizing circuit to the spark generator.

The relay 271 is so constructed that considerably more current is required to operate the contacts 272 and pull the arm 160 than is required to release these members. Such construction and methods for obtaining a large operate-to-release ratio on relays is well known in the electrical art. By the introduction and novel use of this performance characteristic I have provided in a very simple manner the important feature of providing a mileage overlap between the transition from one scale factor to another and have, thereby, avoided continual oscillation between scale factors when the craft whose position is being charted is moving along a value of range which would otherwise be marginal and cause continual transitions between scale factors.

*Automatic ground speed and direction indicator*

By a novel combination of circuits and apparatus I have invented a very useful and important piloting aid to operators of air and surface craft. Heretofore, when an operator wished to know the speed and direction of his craft with respect to the earth it was necessary for him to first determine the velocity of the craft with respect to its supporting medium which may be the sea, land or air, and to then determine the velocity and direction of the tide or wind and thereafter to compute the resultant vector motion of the craft with respect to the earth. According to my invention I have provided an instrument whereby the operator may directly read his ground speed and direction without making any computations whatever except to determine by manual or automatic means the direction and velocity of his drift.

To operate the instrument I utilize the electro-mechanical circuit of Fig. 1 wherein the indicator 1 is a device responsive to either air or water speed of a craft and indicator 34 is responsive to the heading of the craft. Dials 50 and 55 are respectively adjusted to the speed and direction of the drift as determined by independent means or by the manipulation of a drift gage operatively connected to said dials 50 and 55. Assuming for purposes of simplicity that generators 72 and 73 have been disconnected from the circuit, then, as previously described, a potential proportional to the northerly component of ground velocity will appear across impedance 66 and a potential proportional to the easterly component of ground velocity will appear across impedance 67. Let these potentials be designated as $y_v$ and $x_v$, respectively, and let the resultant vector direction of the craft with respect to the ground be $\gamma$.

Instead of energizing the circuit of Fig. 1 with a direct current potential, let the power supplied by sources 14 and 48 be alternating current and let the voltages from sources 14 and 48 be of like frequency and phase with respect to each other.

It is well known that a synchronous transformer such as 23, illustrated in Fig. 5 and sold commercially by the Kollsman Instrument Company as a Model 787–01 Rotatable Transformer, will assume the direction $\gamma$ if its quadrature windings 25 and 27 are energized by potentials $y_v$ and $x_v$, respectively, and the single-phase winding is energized from the source 14 or 48 supplying alternating current as described above. It will then only be necessary to attach a pointer to the shaft 26 of the unit 23 of Fig. 5 to read the direction of travel of the craft on an appropriate scale. This arrangement is further illustrated in Fig. 6 wherein 223 is a rotatable synchronous transformer having a single-phase winding 224 energized from said source 14 or 48 delivering A. C. power as mentioned above. Windings 225 and 227 are connected to junction points 237, Fig. 1 and 238, Fig. 1, respectively, by leads 230 and 231, Fig. 6. Shaft 226, Fig. 6, will then position itself to the angle $\gamma$ and pointer 228 mounted on shaft 226 will show on scale 229 the resultant direction of motion of the craft with respect to the earth. If it is desired to conjointly operate unit 223, Fig. 6, and integrators comprising units 68, 70 and 72, and the units 69, 71 and 73, Fig. 1, the connection between junctions 238 and 240 should be removed and an isolating amplifier provided between these junctions. Likewise the connection between junctions 237 and 239 should then be replaced by an isolating amplifier. These amplifiers will prevent current from the feed-back units 72 and 73 from disturbing the voltage relation at the juncture of resistances 32 and 64 and between resistors 44 and 65 so that they will be at a potential representing the sums, respectively, of the northerly and easterly velocity components. These sums are required for operation of the units 223 and 232, Fig. 6.

By mounting another similar synchronous transformer 232, Fig. 6, for rotation with shaft 226, and also connecting quadrature windings 233 and 234, thereof, to junctions 237 and 238, Fig. 1, over leads 230 and 231, Fig. 6, a potential will be induced in winding 235 which will be proportional to the resultant vector ground velocity of the craft. This potential may be measured on voltmeter 236 calibrated in speed made good over the ground. An isolating amplifier may be used between winding 235 and meter 236 to avoid errors caused by loading the transformer 232 with meter 236.

Hence the craft ground course and direction may be read on a pair of indicators which automatically follow changes in craft and drift speed and direction.

*Use of Cartesian coordinate circuit for operating a terrain image projector*

In my aforesaid application Serial No. 498,906, I have described optical means for projecting an image of an object with respect to which a flight is being made into view of an aircraft crew member or a trainee, the image being accurately varied in scale factor and moved at a speed and in a direction corresponding to the movement of the aircraft during the flight.

Still another application of the electromechanical circuit of the present invention is the operation of this optical projector. According to this combination of apparatus, the projector 174, Fig. 7, is disposed in space at a focal distance from the transparent picture 175 of said object. This picture is mounted on chart 166' for movement therewith. The lamp 176, located in fixed position behind said picture 175, illuminates a portion of the picture, such as arrow 177, for projection purposes. The projector 174 casts an image 179 of the arrow 177 into the projection plane 180 where said image may be viewed by said aircraft crew member or by a trainee.

The image 179 is caused to move with the flight as described in detail in application Serial No. 498,906 referred to above. This movement requires that the picture 175 be displaced with respect to projector 174 in accordance with the flight path of the aircraft. For this purpose shaft 83, Figs. 1 and 7, supported in bearing 189, drives rack 163' which is shaped as a yoke to move the cylinder 164' and roller 167, and thereby chart 166' and picture 175, in a direction parallel to the spline shaft 190' in accordance with the instant longitude of the aircraft. Spline 190' is supported by fixed bearings 193. Shaft 80, Figs. 1 and 7, drives said spline through bevel gears 165 to rotate cylinder 164' and thereby move chart 166' and picture 175 in accordance with the instant latitude of the aircraft.

One additional motion is necessary to provide for the proper movement of image 179 in plane 180. The prisms 181 and 182 must be rotated according to changes in the direction of the flight. For this purpose the synchronous receiver 37, Figs. 1 and 7, operates gear 42, Figs. 1 and 7, to drive gear 183 attached to shaft 184 held by bearing support 185 to rotate bevel gear 186 which turns gear 187 to orient prism 181. The prism 182 is driven in the same direction as prism 181 but at one-half the speed thereof by the gear train 188, as fully described in my aforesaid application S. N. 498,906.

This projection apparatus may be combined with a flight path recorder by mounting pen 191 from the fixed support 192 to bear on chart 166'. The projector 174 may also be combined with the signal controller previously described by means of the circuit shown in Fig. 1.

The optical system described above for depicting objects as seen from aircraft may also be used for depicting subaqueous objects as seen from a watercraft. For this purpose, meter 1, Fig. 1, comprises a speed indicator responsive to the velocity of said ship through the surrounding water. Compass 34 responds to the ship's heading. Dials 40 and 55 are adjusted for wind or tide speed and direction.

*Summary*

Heretofore, it has been necessary for the navigator of an aircraft to plot his course by dead reckoning between points where his position could be accurately determined by reference to known ground objects, celestial objects, or radio range signals. By installing the hereinbefore described apparatus in aircraft, it is possible to display before the pilot and/or navigator a continuous plot of his position over land or sea, which is not subject to human error in calculation, but which is obtained automatically, continuously, and accurately from the flight instruments of the aircraft. The navigator is thereby provided with up-to-the-minute position data which is not lagging by the time required to transfer his computations to a map. Also, he has available accurate means by which to confirm his own computations.

The feature of additionally providing the pilot with simulated radio range signals varying with his flight path is important and useful in training work. It is also an additional safety feature during storms where the actual range signal is obliterated by atmospheric disturbances or where double beams and the like may cause confusion. In my apparatus, a pilot is able not only to note his position on the recording device, but to switch his radio range receiver to the automatic signal controller during the periods that actual range signals are impaired.

In addition, the optical terrain projection unit may be employed to provide the aircraft crew with a visual picture of the terrain over which they are flying. This picture moves in exactly the same manner as the terrain itself would appear to move when viewed from the aircraft. Accordingly, the pilot can see airports, mountains, or military objectives as he approaches and passes over them, or he may set the optical projector to continually display the terrain which is any desired mileage in advance of his present position.

At such times, when definite position fixes are obtainable, any small corrections which may be necessary to the automatic recording, optical projecting, or signal controlling apparatus can be made by turning handwheels 82 and 85 to reposition the shafts 80 and 83, which reset pens 171, Fig. 3, or 191, Fig. 7, the terrain picture 175, and which electrically reset shafts 104 and 105, Fig. 1, and thereby the signal controller and the pen 161.

In the construction of the apparatus of the present invention, there are no loose parts which are held in place by gravity alone. The pen 161, Fig. 2, and the pen 171, Fig. 3, (or 191, Fig. 7) are lightweight elements held in contact with the chart by springs 172, 173, and 194, respectively. Accordingly, the flight path recording mechanisms herein described are particularly suitable for use in aircraft operating under various conditions of acceleration or attitude of flight. The recorders will operate without impairment during steep turns, violent maneuvers, climbs, dives, or even inverted flights. Flight recording apparatus heretofore proposed, such as the gravity weighted devices at present in use, do not possess these features and are inherently restricted to operation on a plotting table which must not be subjected to lateral accelerations or to any inclinations from a substantially horizontal position.

The signal controller mechanisms 88 and 89, Fig. 1, and the optical projector 174, Fig. 7, are likewise rigidly mounted and may be operated in any position or under any accelerations encountered in flight.

The uses of the present invention are very numerous as has been indicated above. It is also to be noted that existing trainers may be equipped with the unitary flight path recorder and signal controller of my invention to render them entirely automatic in operation, thereby eliminating the need for an attending instructor. The unitary apparatus is, moreover, so compact that only a small cabinet is required to house it and a large saving in floor space is effected by eliminating the plotting table and attendant's position heretofore required.

The operation of my unitary recorder and signal controller is so simple that only four adjustment dials need be provided on the face of the control panel. Two of these dials, 82 and 85, select the starting points of the problem; and the other two dials, 50 and 55, select the wind velocity and direction. This simplicity of operation renders the machine particularly well adapted to use by the public or in the training of students. A stamp verifying the date, locality, length of practice period, and machine on which the training was received may be automatically applied to the chart 159 or chart 166 by an electric register 195, Figs. 2 and 3. The register may be operated from a coin control circuit connected as indicated in Fig. 31 of my co-pending application S. N. 398,590. These and many other uses, advantages, and modifications of my invention will occur to those skilled in the art in this type of apparatus, and no limitation is intended, except as set out in the appended claims.

What I claim is:

1. The combination with grounded apparatus adapted to simulate the flight of an aircraft with respect to one or more radio beams, of means for providing a voltage having a parameter varying in accordance with the speed of the simulated flight, a member movable in response to the instant direction of said flight, a source of signals adapted to represent the signals of the one or more radio beams, means comprising an azimuth responsive device and a range responsive device for controlling the intensity of said signals in accordance respectively with instant azimuth and range polar coordinates of the aircraft from a reference direction and reference point, and a receiver for the signals, means for operating said azimuth and range responsive devices comprising a resolver responsive to the direction member and energized according to the parameter of the speed voltage for deriving a voltage $x_v$ and a voltage $y_v$ each in turn having a parameter varying in accordance with the corresponding velocity component of the flight along axes $x$ and $y$, respectively, of a reference Cartesian coordinate system, means for separately integrating the parameters of the $x_v$ and $y_v$ voltages with respect to time, means actuated by the integrating means for deriving a pair of voltages, each voltage of said pair having a parameter adapted to respectively represent instant $x_p$ and $y_p$ Cartesian position coordinates of the aircraft, a Cartesian to polar coordinate converter actuated according to said Cartesian coordinate position representing parameters for moving an azimuth element and a range element in accordance with said polar coordinates of the aircraft, an operative connection between the azimuth element and the azimuth responsive signal controlling device, and means operatively connecting said range element and said range responsive signal controlling device.

2. In combination with grounded apparatus adapted to simulate the flight of an aircraft, means for providing a first pair of voltages, each of said voltages having a parameter varying in accordance with the component of velocity of said flight along respective Cartesian coordinate axes $x$ and $y$, means for separately integrating the parameters of said pair of voltages with respect to time for determining the instant Cartesian position coordinates of the aircraft, means for introducing the effects of drift comprising means for providing an additional voltage having a parameter representing the velocity of the drift, a resolver adjustable to the direction of the drift and energized according to the parameter of the drift velocity voltage for deriving a second pair of voltages each having a parameter representing the components of drift velocity along said $x$ and $y$ axes respectively, and means for modifying the operation of said integrating means to render the integrating means respectively responsive to the resultant of said velocity and drift voltage parameters respectively corresponding to said axes.

3. The combination with aviation apparatus movable with respect to a reference point positioned at the origin of a reference polar coordinate system, of means for providing a voltage having a parameter varying with the speed of the apparatus, a member movable in response to the direction of motion of the apparatus, a source of signals adapted to represent the signals of one or more radio beams, means comprising an azimuth responsive device and a range responsive device for controlling the intensity of said signals in accordance with the instant azimuth and range coordinates of the apparatus in said polar coordinate system, a receiver for the signals, means for operating said azimuth and range responsive devices comprising a resolver responsive to said direction member and energized according to the parameter of the speed voltage for deriving a voltage $x_v$ and a voltage $y_v$ each in turn having a parameter varying in accordance with the corresponding velocity component of the apparatus along axes $x$ and $y$, respectively, said axes being those of a reference Cartesian coordinate system, means for separately integrating the parameters of the $x_v$ and $y_v$ voltages with respect to time, means actuated by said integrating means for deriving a pair of voltages, each voltage of said pair having a parameter adapted to respectively represent the corresponding instant Cartesian position coordinates of the apparatus with respect to said $x$ and $y$ axes, a Cartesian to polar coordinate converter actuated according to said parameters representing the Cartesian position coordinates for moving an azimuth element and a range element in accordance with the respective polar coordinates of the apparatus from said reference point, means operatively connecting said azimuth element and said azimuth responsive device and means operatively connecting said range element and said range responsive device.

4. The combination with aviation training apparatus moving in a reference Cartesian coordinate system having axes $x$ and $y$, of means for providing a first pair of voltages, each of said voltages having a parameter varying in accordance with the component of velocity of the apparatus along the respective $x$ and $y$ axes, means for separately integrating the parameters of said pair of voltages with respect to time for determining the instant Cartesian position coordinates of the apparatus, means for introducing the effects of drift comprising means for providing an additional voltage having a parameter representing the velocity of the drift, a resolver adjustable to the direction of the drift and energized according to the parameter of the drift voltage for deriving a second pair of voltages each of said voltages in turn having a parameter varying in accordance with the component of velocity of the drift along said $x$ and $y$ axes respectively, and means for rendering the integrating means respectively responsive to the resultant of said velocity of the apparatus and velocity of the drift voltage parameters respectively corresponding to said axes.

5. The combination with grounded apparatus adapted to simulate the flight of an aircraft, of means for providing a voltage having a parameter varying in accordance with the speed of the simulated flight, a member movable in response to the direction of said flight and a course indicating device having an azimuth unit and a range unit movable in accordance with respective polar coordinates of the aircraft determined from a given reference direction and a given reference point for the course of said flight, means for operating said course indicating device comprising a resolver responsive to said flight direction member and energized in accordance with the parameter of said speed voltage for deriving a voltage $x_v$ and a voltage $y_v$ each in turn having a parameter varying in accordance with the corresponding velocity component of the flight along axes $x$ and $y$, respectively, said axes being those of a reference Cartesian coordinate system, means for separately integrating the parameter of the $x_v$ voltage and the parameter of the $y_v$ voltage with respect to time, means actuated by said integrating means for providing voltages represented as position-designating voltages $E_x$ and $E_y$, said position voltages each having a parameter adapted to respectively represent instant $x_p$ and $y_p$ Cartesian position coordinates of said aircraft with reference to said $x$ and $y$ axes, a Cartesian-to-polar coordinate converter actuated according to said $E_x$ and $E_y$ parameters whereby to move an azimuth element and a range element in accordance with said polar coordinates of said aircraft from said reference point, an operative connection between said azimuth unit and azimuth element, and a second operative connection between said range unit and range element.

6. The combination with aviation apparatus moving in a reference coordinate system, of means for providing a voltage having a parameter varying in accordance with the speed of the apparatus, a member movable in response to the direction of motion of the apparatus and a course indicating device having an azimuth unit and a range unit moving in accordance with the respective polar coordinates of the apparatus measured from a reference direction and a reference point, means for operating said course indicating device comprising a resolver responsive to said flight direction member and energized according to the parameter of said speed voltage for deriving a voltage $x_v$ and a voltage $y_v$ each in turn having a parameter varying in accordance with the corresponding velocity component of the apparatus along axes $x$ and $y$, respectively, of a reference Cartesian coordinate system, means for separately integrating the parameters of the $x_v$ and $y_v$ voltages with respect to time, means actuated by said integrating means for providing voltages represented as position-designating voltages $E_x$ and $E_y$, said position voltages each having a parameter adapted to respectively represent instant $x_p$ and $y_p$ Cartesian position coordinates of the apparatus with reference to said $x$ and $y$ axes, a Cartesian to polar coordinate converter actuated according to the parameters of said $E_x$ and $E_y$ voltages for moving an azimuth element and a range element in accordance with the respective polar coordinates of the apparatus from the reference point and direction, an operative connection between the azimuth unit and azimuth element and an operative connection between the range unit and range element.

7. The combination with grounded apparatus adapted to simulate the flight of an aircraft, of means for providing a voltage having a parameter varying in accordance with the speed of said simulated flight, a member movable in response to the instant direction of said aircraft in said flight, a course indicating device having two elements movable respectively in directions $x$ and $y$ of the axes of a reference Cartesian coordinate system and means responsive to said movable elements for indicating the path of said flight on a charting surface, and means for operating said elements, said operating means comprising a resolver energized in accordance with the parameter of said speed voltage and adjusted in response to the flight direction responsive member for deriving a voltage $x_v$ and a voltage $y_v$ each in turn having a parameter varying in accordance with the respective components of velocity of the aircraft along the $x$ and $y$ axes, means for separately integrating the parameters of the $x_v$ and $y_v$ voltages with respect to time, and means for operatively connecting the course indicating device elements to said $x_v$ and $y_v$ parameter integrating means to control the movement of the elements in the $x$ and $y$ directions.

8. The combination with apparatus of the character described and operable to develop a course with respect to axes $x$ and $y$ of a reference Cartesian coordinate system, of means for providing a voltage having a parameter varying with the velocity of development of said course, an element movable in response to the instant direction of said course, a device for indicating the course comprising a charting surface and a stylus movable with respect thereto, a resolver energized according to the parameter of said velocity voltage and positioned in response to said direction element; said resolver being adapted to derive a voltage $x_v$ and a voltage $y_v$ each in turn having a parameter varying with the respective component of the velocity along the $x$ and $y$ axes, means for separately integrating the parameters of the $x_v$ and $y_v$ voltages with respect to time to determine the instant Cartesian position coordinates of said course and means operatively connecting the integrating means and the course indicating device for producing relative motion between said surface and stylus in accordance with changes in said instant Cartesian position coordinates.

9. The combination with apparatus of the character described adapted to simulate the movement of a craft with respect to the signals of one or more radio beams located in a reference Cartesian coordinate system having axes $x$ and $y$, of means for providing a voltage having a parameter varying with the speed of said craft, a member movable in response to the direction of motion of the craft, a source of signals adapted to represent the signals of said one or more beams and a receiver therefor, and means for controlling the intensity of the signals according to the position of a pair of elements moving in the respective directions of said $x$ and $y$ axes, a resolver energized according to the parameter of said speed voltage and positioned in response to said direction member, said resolver being adapted to derive a voltage $x_v$ and a voltage $y_v$ each in turn having a parameter varying with the components of velocity of the craft along the $x$ and $y$ axes respectively, means for separately integrating the parameters of the $x_v$ and $y_v$ voltages with respect to time to determine the instant Cartesian position coordinates of said craft and means operatively connecting the integrating means and said elements to operate said signal controlling means.

10. The combination with apparatus of the character described and operable to develop a course with respect to an object positioned in a reference Cartesian coordinate system having axes $x$ and $y$, of means for providing a voltage having a parameter varying with the developed velocity of said course, an element movable in response to the instant direction of said course, a resolver energized according to the parameter of said velocity voltage and positioned in response to said direction element for deriving a voltage $x_v$ and a voltage $y_v$ each in turn having a parameter varying with the respective component of said velocity along the $x$ and $y$ axes, means for separately integrating the parameters of the $x_v$ and $y_v$ voltages with respect to time to determine the instant Cartesian position coordinates of said apparatus in said reference system, a picture of the object, a source of illumination for said picture, a plane into which to project the picture, a projector spacially disposed with respect to the picture and the plane, said projector including optical means for producing in said plane an image of any selected part of the picture and means operatively connected to the integrating means for producing relative motion between the projector and the picture in accordance with changes in said position coordinates to cause the image to move in the plane according to the operation of said apparatus.

11. The combination with apparatus of the character described operable to develop a course with respect to a reference object positioned in a Cartesian coordinate reference system having axes $x$ and $y$, of means for providing a voltage having a parameter varying with the velocity of development of said course, an element movable in response to the instant direction of said course, a resolver energized according to the parameter of said velocity voltage and positioned in response to said direction element, said resolver being adapted to derive a voltage $x_v$ and a voltage $y_v$ each in turn having a parameter varying with the respective component of said velocity along the $x$ and $y$ axes respectively, means for separately integrating the parameters of the $x_v$ and $y_v$ voltages with respect to time to determine the corresponding instant Cartesian position coordinates of said apparatus in said reference systems, a picture of the object, a projection plane, a source of illumination for said picture, a projection system optically interposed between the picture and the plane for producing an image of the picture in said plane, optical means disposed in the optical path of the system whereby the image of the picture may be rotated in the projection plane without rotating said picture, means responsive to said direction element for adjusting said rotatable optical means with changes in the direction of said course, and means operatively connected to the integrating means for producing relative motion between the projector and the picture in accordance with changes in said position coordinates whereby to cause the image to move in said plane in accordance with the operation of said apparatus.

12. In combination with training apparatus adapted to simulate the movement of a craft with respect to one or more radio beams located in a reference Cartesian coordinate system having axes $x$ and $y$, means for providing a voltage having a parameter varying with the speed of said craft, a member movable in response to the instant direction of the craft, a source of signals adapted to represent the signals of the said one or more beams and a receiver therefor, means for controlling the intensity of the signals comprising an element having a parameter varying in accordance with the field strength distribution of the one or more beams, a scanning device for the element responsive to the parameter thereof for adjusting the signals in amplitude, a resolver energized according to the parameter of said speed voltage and positioned in response to the direction member, said resolver being adapted to derive a voltage $x_v$ and a voltage $y_v$ each having a parameter varying with the respective velocity components of the craft along the $x$ and $y$ axes respectively, means for separately integrating the parameters of the $x_v$ and $y_v$ voltages with respect to time to determine the instant Cartesian position coordinates of said craft in said references system, and means operatively connected to the integrating means for producing relative motion between the element and the scanning device in accordance with changes in said position coordinates.

13. In combination with training apparatus adapted to simulate the movement of a craft with respect to one or more radio beams, an element movable in accordance with the speed of the craft and another element movable in response to the heading of the craft, a source of signals adapted to represent the signals of the one or more radio beams, a receiver for the signals and means for controlling the intensity of the signals comprising an element having a parameter varying with the field strength distribution of the one or more radio beams, a scanning device for the element responsive to the parameter thereof and adapted to modulate the signals, a resolver responsive conjointly to the heading element and the speed element for respectively moving a pair of members in accordance with the components of velocity of the craft along $x$ and $y$ axes of a reference Cartesian coordinate system, means for separately integrating the individual motions of said members with respect to time to determine the instant Cartesian position coordinates of said craft and means operatively connected to the integrating means for producing relative motion between the element and the scanning device in accordance with changes in said position coordinate.

14. The combination with apparatus adapted to simulate the movement of a craft with respect to one or more radio beams, of an element movable in accordance with the speed of the craft and another element movable in response to the heading of the craft, a source of signals adapted to represent the signals of the one or more radio beams, a receiver for the signals and means comprising an azimuth device and a range device for controlling the intensity of said signals in accordance respectively, with azimuth and range coordinates of the craft in a reference polar coordinate system, means for operating said azimuth and range devices comprising a velocity resolver responsive conjointly to the heading element and the speed element for moving a pair of members in accordance with the components of velocity of the craft along $x$ and $y$ axes respectively, of a reference Cartesian coordinate system, means for separately integrating the motions of said members with respect to time for determining the instant Cartesian position coordinates of the craft in said Cartesian system, a Cartesian to polar coordinate converter actuated by the integrating means and means operatively connecting the converter to said azimuth and range devices.

15. In combination with training apparatus adapted to simulate the movement of a craft with respect to one or more radio beams, a source of signals adapted to represent the signals of said one or more radio beams, a receiver for the signals, a polar coordinate reference system for defining the instant position of the craft with respect to an arbitrary reference point and reference direction, a first element movable in accordance with the distance of the craft from said point, and a second element movable in accordance with the azimuth of said craft from said reference direction, a controller for the signals comprising a range volume control circuit responsive to said first element and an azimuth volume control circuit responsive to said second element, means for simultaneously indicating the course of the craft comprising a charting surface and a stylus, first means actuated by said first element for producing relative motion between said charting surface and said stylus in accordance with said craft distance and second means actuated by said second element for producing relative motion between said charting surface and stylus in accordance with said craft azimuth from the reference direction.

16. The combination with aviation apparatus adapted to simulate an aircraft moving with respect to one or more radio beams, of means providing a voltage having a parameter varying in accordance with the speed of the simulated flight, a member movable in response to the instant direction of said flight, a source of signals adapted to represent the signals of the one or more radio beams, means comprising a range responsive device and an azimuth responsive device for controlling the intensity of said signals in accordance respectively with instant range and azimuth polar coordinates of said aircraft from a reference point and a reference direction, a receiver for the signals, means for operating said range and azimuth responsive devices comprising a resolver responsive to the direction member and energized according to the parameter of the speed voltage for deriving a voltage $x_v$ and a voltage $y_v$ each in turn having a parameter varying in accordance with the corresponding velocity components of said aircraft along axes $x$ and $y$, respectively, of a reference Cartesian coordinate system, means for separately integrating the parameters of the $x_v$ and $y_v$ voltages with respect to time, means actuated by each integrator for respectively providing a voltage having a parameter adapted to represent the instant Cartesian position coordinates $x_p$ or $y_p$ of said moving aircraft, a Cartesian to polar coordinate converter actuated according to said position representing parameters for moving an azimuth element and a range element in accordance with said polar coordinates of said aircraft, an operative connection between the azimuth element and the azimuth responsive signal controlling device and means for operatively connecting the range element and the range responsive signal controlling device.

17. The combination with grounded apparatus adapted to simulate a maneuvering craft, of means for providing a voltage having a parameter varying in accordance with the speed of the simulated maneuver, a member movable in response to the instant direction of the maneuver and a course indicating device having a range unit and an azimuth unit movable in accordance with respective instant range and azimuth polar coordinates of said simulated craft from a reference point and reference direction for indicating the course of said maneuver, means for operating said indicating device comprising a resolver responsive to said direction member and energized according to the parameter of the speed voltage for deriving a voltage $x_v$ and a voltage $y_v$ each in turn having a parameter varying in accordance with the corresponding velocity component of said aircraft along axes $x$ and $y$ respectively of a reference Cartesian coordinate system, means for separately integrating the parameters of the $x_v$ and $y_v$ voltages with respect to time, means actuated by each integrator for respectively providing a voltage having a parameter adapted to represent the instant Cartesian position coordinate $x_p$ or $y_p$ of said maneuvering craft, a Cartesian to polar coordinate converter actuated according to said position representing parameters to move a range element and an azimuth element in accordance with said polar coordinates of said simulated craft from the reference point and reference direction, an operative connection between said range unit and said range element, and means operatively connecting said azimuth unit and azimuth element to control the operation of said charting device.

18. Apparatus according to claim 16 in which the parameter of the $x_v$ and $y_v$ voltages is the respective potential of each said voltage and in which each integrating means comprises a motor energized under control of a thermionic tube amplifier, a first input circuit for the amplifier energized in accordance with its respective $x_v$ or $y_v$ potential, a second input for the amplifier energized by a feedback current having a magnitude and polarity such that the effect of said current on the amplifier is to render constant the proportionality between the speed of the motor and the potential energizing the first input circuit and an element movable in accordance with the total movement of the motor during a given time interval to actuate said means for providing the voltage representing the $x_p$ or $y_p$ Cartesian position coordinate.

19. Apparatus according to claim 17 in which the parameter of the $x_v$ and $y_v$ voltages is the respective potential of said voltages and in which each integrating means comprises motive means energized under control of a thermionic tube amplifier, a first input circuit for the amplifier energized in accordance with its respective $x_v$ or $y_v$ potential, a second input for the amplifier energized by a feedback current having a magnitude and polarity such that the effect of said current on the amplifier is to render constant the proportionality between the speed of said motive means and the potential energizing the first input circuit and an element movable in accordance with the total movement of said motive means during a given time interval to actuate said means for providing the voltage representing the $x_p$ or the $y_p$ Cartesian position coordinate.

20. The combination with grounded apparatus adapted to simulate a maneuvering craft, of means for providing a voltage having a parameter varying in accordance with the speed of the simulated maneuver, a member movable in response to the instant direction of the maneuver, a course charting device having two elements movable respectively in directions $x$ and $y$ of the axes of a reference Cartesian coordinate system and means responsive to said movable elements for indicating the path of the flight on a charting surface, and means for operating said elements, said operating means comprising a resolver energized according to the parameter of said speed voltage and adjusted in response to the direction responsive member for deriving a voltage $x_v$ and a voltage $y_v$ each in turn having a parameter varying in accordance with the respective components of velocity of the aircraft along the $x$ and $y$ axes, individual means for separately integrating the parameters of the $x_v$ and $y_v$ voltages with respect to time, and an operative connection between said integrating means and the charting device elements moving in the $x$ and $y$ directions.

21. Apparatus according to claim 20 in which the parameters of the $x_v$ and $y_v$ voltages are the respective potentials of said voltages and in which each integrating means comprises motive means energized under control of a thermionic tube amplifier, a first input circuit for the amplifier energized in accordance with its respective $x_v$ or $y_v$ potential, a second input for the amplifier energized by a feedback current having a magnitude and polarity such that the effect of said current on the amplifier is to render constant the proportionality between the speed of said motive means and the potential energizing the first input circuit and an element movable in accordance with the total movement of said motive means during a given time interval to actuate said means for providing the voltage representing the $x_p$ or $y_p$ Cartesian position coordinate.

22. The combination with training apparatus adapted to simulate the flight of an aircraft with respect to axes $x$ and $y$ of a reference Cartesian coordinate system, of means for providing a voltage having a parameter varying in accordance with the operating speed of the simulated flight, a member movable in response to the instant direction of said flight, a device for indicating the course of the flight comprising a charting surface and a stylus movable with respect to the surface, a resolver energized in accordance with the parameter of the speed voltage and adjusted in response to said direction member for deriving a voltage $x_v$ and a voltage $y_v$ each in turn having a parameter varying in accordance with the corresponding velocity component of said aircraft along the axes $x$ and $y$ respectively, means for separately integrating the parameters of the $x_v$ and $y_v$ voltages with respect to time to determine the instant Cartesian position coordinates $x_p$ and $y_p$ of said flight and means operatively connecting the integrating means and the course indicating device for producing relative motion between the surface and stylus in accordance with changes in said instant Cartesian position coordinates.

23. Apparatus according to claim 22 in which the parameter of the $x_v$ and $y_v$ voltages is the respective potential of each said voltage and in which each integrating means comprises motive means energized under control of a thermionic tube amplifier, a first input circuit for the amplifier energized in accordance with its respective $x_v$ and $y_v$ potential, a second input for the amplifier energized by a feedback current having a magnitude and polarity such that the effect of said current on the amplifier is to render constant the proportionality between the speed of said motive means and the potential energizing the first input circuit and an element movable according to the total movement of said motive means in a given time interval.

24. Apparatus according to claim 1 in which the parameter of the pair of voltages representing the instant position coordinates is the potential of said voltages, the instant potential values of said voltages being represented by $E_x$ and $E_y$ respectively, and in which the coordinate converter comprises angularly adjustable means energized according to the potentials $E_x$ and $E_y$ for deriving a control voltage varying with the difference between $E_x \sin \theta$ and $E_y \cos \theta$ where $\theta$ is the angular adjustment of said control voltage deriving means with respect to said reference direction, means responsive to the control voltage for changing the angle $\theta$ to minimize the control voltage, an operative connection between the angle changing means and said azimuth element to position said element in accordance with the angle $\theta$, means movable in accordance with the angle $\theta$ and energized according to the $E_x$ and $E_y$ potentials for deriving voltages proportional to $E_x \cos \theta$ $E_y \sin \theta$ and means for positioning said range element in accordance with the values of said $E_x \cos \theta$ $E_y \sin \theta$ derived voltages.

25. Apparatus according to claim 3 in which the parameter of the pair of voltages representing the instant position coordinates is the potential of said voltages, the instant potential values of said voltages being represented by $E_x$ and $E_y$ respectively, and in which the coordinate converter comprises angularly adjustable means energized according to the potentials $E_x$ and $E_y$ for deriving a control voltage varying with the difference between $E_x \sin \theta$ and $E_y \cos \theta$ where $\theta$ is the angular adjustment of said control voltage deriving means with respect to said reference direction, means responsive to the control voltage for changing the angle $\theta$ to minimize the control voltage, an operative connection between the angle changing means and said azimuth element to position said element in accordance with the angle $\theta$, means movable in accordance with the angle $\theta$ and energized according to the $E_x$ and $E_y$ potentials for deriving voltages proportional to $E_x \cos \theta$ and $E_y \sin \theta$ and means for positioning said range element in accordance with the values of said $E_x \cos \theta$ and $E_y \sin \theta$ derived voltages.

26. Apparatus according to claim 5 in which the parameter of the pair of voltages representing the instant position coordinates is the potential of said voltages, the instant potential values of said voltages being represented by $E_x$ and $E_y$ respectively, and in which the coordinate converter comprises angularly adjustable means energized according to the potentials $E_x$ and $E_y$ for deriving a control voltage varying with the difference between $E_x \sin \theta$ and $E_y \cos \theta$ where $\theta$ is the angular adjustment of said control voltage deriving means with respect to said reference direction, means responsive to the control voltage for changing the angle $\theta$ to minimize the control voltage, an operative connection between the angle changing means and said azimuth element to position said element in accordance with the angle $\theta$, means movable in accordance with the angle $\theta$ and energized according to the $E_x$ and $E_y$ potentials for deriving voltages proportional to $E_x \cos \theta$ and $E_y \sin \theta$ and means for positioning said range element in accordance with the values of said $E_x \cos \theta$ and $E_y \sin \theta$ derived voltages.

27. Apparatus according to claim 6 in which the parameter of the pair of voltages representing the instant position coordinates is the potential of said voltages, the instant potential values of said voltages being represented by $E_x$ and $E_y$ respectively, and in which the coordinate converter comprises angularly adjustable means energized according to the potentials $E_x$ and $E_y$ for deriving a control voltage varying with the difference between $E_x \sin \theta$ and $E_y \cos \theta$ where $\theta$ is the angular adjustment of said control voltage deriving means with respect to said reference direction, means responsive to the control voltage for changing the angle $\theta$ to minimize the control voltage, an operative connection between the angle changing means and said azimuth element to position said element in accordance with the angle $\theta$, means movable in accordance with the angle $\theta$ and energized according to the $E_x$ and $E_y$ potentials for deriving voltages proportional to $E_x \cos \theta$ and $E_y \sin \theta$ and means for positioning said range element in accordance with the values of said $E_x \cos \theta$ and $E_y \sin \theta$ derived voltages.

28. In combination with grounded apparatus adapted to simulate a craft maneuvering with respect to one or more radio beams, means for providing a potential varying in accordance with the speed of the simulated maneuver, a source of signals adapted to represent the signals of the one or more radio beams, means comprising an azimuth responsive device and a range responsive device for controlling the intensity of said signals in accordance respectively with instant azimuth and range polar-coordinates of the craft from a reference direction and a reference point, a receiver for the signals, a course charting mechanism having an azimuth unit and a range unit movable in accordance with the respective polar coordinates of the craft for indicating the course of said maneuver, means for operating said azimuth and range responsive devices and units comprising a resolver responsive to the instant heading of said craft and energized in accordance with the speed potential for deriving a potential $x_v$ and a potential $y_v$ representing, respectively, the components of velocity of the craft along axes $x$ and $y$ of a reference Cartesian coordinate system, individual means for separately integrating the $x_v$ and $y_v$ potentials with respect to time, said integrating means each comprising motive means energized under control of a thermionic tube amplifier, a first input circuit for the amplifier energized in accordance with its respective $x_v$ or $y_v$ potential, a second input circuit for the amplifier energized by a feedback current derived from the operation of said motive means, said feedback current having a magnitude and polarity such that the effect of said current on the amplifier is to render constant the proportionality between the speed of said motive means and the potential energizing the first input circuit, means actuated by said motive means of each integrating means for respectively providing potentials represented as position-designating potentials $E_x$ and $E_y$ corresponding to the instant Cartesian coordinates representing the position of the craft in said Cartesian reference system, a Cartesian to polar coordinate converter comprising angularly adjustable means energized according to the potentials $E_x$ and $E_y$ for deriving a control voltage varying with the difference between $E_x \sin \theta$ and $E_y \cos \theta$ where $\theta$ is the angular adjustment of said control voltage deriving means with respect to said reference direction, means responsive to the control voltage for changing the angle $\theta$ in such manner as to minimize the control voltage, means movable in accordance with the angle $\theta$ and energized according to the $E_x$ and $E_y$ potentials for deriving voltages proportional to $E_x \cos \theta$ and $E_y \sin \theta$, means for conjointly positioning the charting mechanism range unit and the range responsive signal controlling device in accordance with the values of said $E_x \cos \theta$ and $E_y \sin \theta$ derived voltages and an operative connection between the $\theta$ angle changing means, the azimuth unit of the charting mechanism and the azimuth responsive signal controlling device.

29. In combination with a craft maneuvering with respect to signals adapted to represent the signals of one or more radio beams, a source of the signals and a receiver therefor, means comprising an azimuth responsive device and a range responsive device for controlling the intensity of the signals in accordance respectively with instant azimuth and range polar coordinates of the craft from a reference direction and a reference point, a course charting mechanism having an azimuth unit and a range unit movable in accordance with said respective instant polar coordinates of the craft; means for providing a potential varying in accordance with the speed of the craft, a resolver actuated in accordance with the instant heading of the craft and energized in accordance with the speed potential for deriving a potential $x_v$ and a potential $y_v$ representing, respectively, the components of velocity of the craft along axes $x$ and $y$ of a reference Cartesian coordinate system, individual means for separately integrating the $x_v$ and $y_v$ potentials with respect to time, said integrating means each comprising motive means energized under control of a thermionic tube amplifier, a first input circuit for the amplifier energized in accordance with its respective $x_v$ or $y_v$ potential, a second input circuit for the amplifier energized by a feedback current derived from the operation of said motive means, said feedback current having a magnitude and polarity such that the effect of said current on the amplifier is to render constant the proportionality between the speed of said motive means and the potential energizing the first input circuit; means actuated by said motive means of each integrating means for respectively providing potentials represented as position-designating potential $E_x$ and $E_y$ corresponding to instant Cartesian coordinates representing the position of the craft in said Cartisian reference system, a Cartesian to polar coordinate converter comprising angularly adjustable means energized according to the potentials $E_x$ and $E_y$ for deriving a control voltage varying with the difference between $E_x \sin \theta$ and $E_y \cos \theta$, where $\theta$ is the angular adjustment of said control voltage deriving means with respect to said reference direction, means responsive to the control voltage for changing the angle $\theta$ in such manner as to minimize the control voltage, means movable in accordance with the angle $\theta$ and energized according to the $E_x$ and $E_y$ potentials for deriving voltages proportional to $E_x \cos \theta$ and $E_y \sin \theta$, means for conjointly positioning the range unit of the charting mechanism and the range responsive unit of the signal controlling device in accordance with the values of said $E_x \cos \theta$ and $E_y \sin \theta$ derived voltages and in operative connection between said $\theta$ angle changing means, the azimuth unit of the charting mechanism and the azimuth responsive signal controlling device for conjointly positioning said last mentioned unit and device in accordance with said azimuth angle $\theta$.

30. In combination with grounded apparatus adapted to simulate the flight of an aircraft with respect to one or more radio beams, means for providing a potential varying in accordance with the speed of said flight, a course charting device having two elements movable respectively in directions $x$ and $y$ of the axes of a reference Cartesian coordinate system and means responsive to said movable elements for indicating the path of the flight on a charting surface, means for operating said elements comprising a resolver actuated in accordance with the instant heading of the apparatus in said flight and energized in accordance with the speed potential for deriving a potential $x_v$ and a potential $y_v$ representing, respectively, the components of velocity of the aircraft along axes $x$ and $y$ of the reference Cartesian coordinate system, individual means for separately integrating the $x_v$ and $y_v$ potentials with respect to time to determine the instant position coordinates $x_p$ and $y_p$ of the aircraft in the reference system, said integrating means each comprising motive means energized under control of a thermionic tube amplifier, a first input circuit for the amplifier energized in accordance with its respective $x_v$ or $y_v$ potential, a second input circuit for the amplifier energized by a feedback current derived from a means associated with and responsive to the operation of said motive means, said feedback current having a magnitude and polarity such that the effect of said current on the amplifier is to render constant the proportionality between the speed of said motive means and the potential energizing the first input circuit; an operative connection between each of said integrating motive means and the charting device elements to cause said elements to move in response to the $x_p$ and $y_p$ position coordinates; a source of signals adapted to represent those of the said one or more radio beams, means comprising an azimuth responsive device and a range responsive device for controlling the intensity of said signals in accordance, respectively, with azimuth and range polar coordinates of the aircraft from a reference direction and a reference point, and a receiver for the signals; means actuated by said motive means of each integrating means for respectively providing potentials represented as position-designating potentials $E_x$ and $E_y$ corresponding to the instant Cartesian position coordinates representing the position of the aircraft in said Cartesian reference system, a Cartesian to polar coordinate converter comprising angularly adjustable means energized according to the potentials $E_x$ and $E_y$ for deriving a control voltage varying with the difference between $E_x \sin \theta$ and $E_y \cos \theta$, where $\theta$ is the angular adjustment of said control voltage deriving means with respect to said reference direction, means responsive to said control voltage for changing the angle $\theta$ so as to minimize the control voltage, means operatively connected to the angle changing means and energized according to the $E_x$ and $E_y$ potentials for deriving voltages proportional to $E_x \cos \theta$ and $E_y \sin \theta$, an operative connection between said angle changing means and the said azimuth responsive signal controlling device for adjusting said azimuth device to the angle $\theta$, and means for positioning said range responsive signal controlling device in accordance with the values of said $E_x \cos \theta$ and $E_y \sin \theta$ derived voltages.

31. The combination of apparatus of the character described maneuvering with respect to a Cartesian coordinate reference system having axes $x$ and $y$, of means for determining the instant position coordinates $x_p$ and $y_p$ of said apparatus in said coordinate system during said maneuver; said position determining means comprising means for providing a pair of potentials $x_v$ and $y_v$ varying respectively in accordance with the components of velocity of said apparatus along said $x$ and $y$ axes, individual means for separately integrating the $x_v$ and $y_v$ potentials with respect to time, said integrating means each comprising motive means energized under control of a thermionic tube amplifier, a first input circuit for the amplifier energized in accordance with its respective $x_v$ or $y_v$ potential, a second input circuit for the amplifier energized by a feedback current derived from a condenser associated with a switching means operated by said motive means for alternately connecting the condenser to a source of potential and discharging said condenser through said second input circuit with a discharge polarity determined by the direction of operation of said motive means, and an element adapted to represent the respective $x_p$ or $y_p$ position coordinate of the apparatus moved by said motive means.

32. In combination with grounded aviation apparatus adapted to simulate the movement of an aircraft with respect to one or more radio beams located in a reference Cartesian coordinate system having axes $x$ and $y$, a source of signals adapted to represent the signals of the one or more radio beams and a receiver therefor, means for controlling the intensity of the signals according to the position of a pair of elements movable respectively in the directions of said $x$ and $y$ axes, means for operating said elements comprising means for providing a potential varying with the simulated speed of said aircraft, a resolver actuated in accordance with the instant direction of the simulated movement of the aircraft and energized in accordance with the speed potential for deriving a potential $x_v$ and a potential $y_v$ representing, respectively, the components of velocity of said aircraft along said $x$ and $y$ axes, individual means for separately integrating the $x_v$ and $y_v$ potentials with respect to time, an operative connection between each integrating means and the respective $x$ and $y$ element, a course charting device comprising a charting surface and a stylus cooperating therewith and means for operatively connecting the integrating means and the charting device to produce relative motion between said surface and stylus in accordance with changes in the instant Cartesian position coordinates.

33. Apparatus of the character described moving with respect to signals adapted to represent one or more radio beams located in a Cartesian coordinate reference system having axes $x$ and $y$, a source of the signals and a receiver therefor, means for controlling the intensity of the signals according to the position of a pair of elements movable respectively in the directions of the $x$ and $y$ axes, means for operating said elements comprising means for deriving a voltage having a parameter varying with the speed of said apparatus, a resolver actuated in accordance with the direction of movement of the apparatus and energized in accordance with the parameter of the speed voltage for deriving a voltage $x_v$ and a voltage $y_v$ each in turn having a parameter varying in accordance with the corresponding velocity component of movement along axes $x$ and $y$ respectively, means for separately integrating the parameters of the $x_v$ and $y_v$ voltages with respect to time, an operative connection between each of the integrating means and the respective $x$ and $y$ element, a course indicating device comprising a charting surface and a stylus associated with the surface and means for operatively connecting the integrating means and the course indicating device to produce relative motion between said surface and stylus in accordance with changes in the instant Cartesian position coordinates.

34. In combination with aviation apparatus adapted to simulate the flight of an aircraft with respect to a plurality of radio beams, a source of signals representing said beams, a common receiver for the signals, switching means for introducing each such beam at predetermined locations along the flight path, means for smoothly fading in and fading out said signals comprising a plurality of vacuum tube devices each having an input circuit separately energized by the signals representing the respective beams, an output circuit coupled to the common receiver and a cathode heated under control of the switching means to introduce the particular beam transmitted by that device at the predetermined location.

35. Aviation apparatus operable to describe a real or simulated flight, in combination with means for providing a voltage having a parameter varying in accordance with the speed of said real or simulated flight, a member movable in response to the angle of inclination of the path of said flight with respect to a horizontal plane intercepting said apparatus, and a resolver responsive to said member and energized in accordance with the above-mentioned parameter to derive a voltage having a parameter corresponding to the instant value of the real or simulated component of horizontal velocity and a voltage having a parameter corresponding to the instant value of the real or simulated component of vertical velocity of said apparatus.

36. Apparatus of the character described operable to develop a real or simulated path of motion with respect to a medium drifting with respect to the earth, of means for providing a potential having a magnitude corresponding to the velocity of said motion, a resolver energized by the above-mentioned potential and movable in accordance with the direction of said real or simulated motion of said apparatus to derive a first pair of potentials representing respectively the components of velocity of said motion along axes $x$ and $y$ of a reference Cartesian coordinate system, means for providing a potential corresponding to the velocity of said drift, a second resolver adjustable to the direction of said drift and energized by said drift potential to derive a second pair of potentials each in turn representing the respective components of drift velocity in said directions $x$ and $y$, electronic means for operating motive means at a speed proportional to the resultant of the potentials representing said motion and drift components along the $x$ axis to move a member to represent the component of motion of said apparatus with respect to the earth along said $x$ axis, electronic means for operating a second motive means at a speed proportional to the resultant of the potentials representing said motion and drift components along the $y$ axis to move a second member to represent the component of motion of said apparatus with respect to the earth along said $y$ axis, each of said electronic means comprising a thermionic amplifier energized by the associated one of said resultant potentials and by a negative feedback current provided by means regulating said current in accordance with the speed of said motive means controlled by that amplifier.

37. In a craft movable with respect to a supporting medium which in turn is supported by and has motion over the earth, a device for indicating the speed and direction of said craft with respect to the earth, said device comprising means for providing a voltage having a parameter varying in accordance with the speed of said craft with respect to said medium, means responsive to the heading of said craft and energized in accordance with the parameter of said craft speed voltage for deriving a first pair of voltages each having a parameter in turn representing the instant components of velocity of said craft along axes $x$ and $y$ respectively, of a reference Cartesian coordinate system, means for providing a voltage having a parameter varying in accordance with the speed of drift of said medium with respect to the earth, a second resolver adjustable to the direction of said drift of said medium and energized in accordance with the parameter of said drift voltage for deriving a second pair of voltages each having a parameter representing the respective components of drift of said craft along said $x$ and $y$ axes, means conjointly responsive to the parameters of the voltages of both said pairs for indicating the direction of motion of the craft with respect to the earth, means responsive to said direction indicating means and energizing in accordance with the parameters of the voltages of both said pairs for deriving a potential having a parameter proportional to the speed of said craft with respect to the earth and means actuated in accordance with said last named parameter for indicating the speed of said craft with respect to the earth.

38. In a craft moving with respect to a supporting medium which in turn is supported by and has motion over the ground, a device for indicating the speed and direction of said craft with respect to the ground, said device comprising an element responsive to the speed of the craft through said medium, a source of potential, a potential selecting device energized from the source and adjusted by said element to select a potential proportional to the speed of the craft through said medium, a direction element movable in accordance with the heading of the craft, a resolver comprising means energized by the potential selected according to the speed of the craft and responsive to the direction element for deriving a first pair of potentials representing the respective components of velocity of said craft along axes $x$ and $y$ of a reference Cartesian coordinate system, a second voltage selecting device energized from said source and adjustable to select a potential representing the drift speed of said medium with respect to the ground, second resolving means energized by the potential representing the speed of the drift and actuated in response to said direction of said drift for deriving a second pair of potentials each respectively representing the components of velocity of drift along said $x$ and $y$ axes, means responsive to the resultant of said potentials representing said motion and drift components along the $x$ axis and to the resultant of said potentials representing said motion and drift components along the $y$ axis for positioning an indicator to show the direction of movement of the craft with respect to the ground, means responsive to the last named means and energized by both said resultants for deriving a potential proportional to the ground velocity of said craft, and speed indicating means energized by said ground speed potential.

39. The combination of apparatus of the character described having a speed indicator and a course direction indicator, with a device for charting the course of the apparatus and operating according to range and azimuth polar coordinates of the instant position of the apparatus with respect to a reference point and a reference direction, said charting device comprising a charting surface, course indicating means movable with respect to the surface, an electro-mechanical circuit responsive to the speed indicator and to the direction indicator for producing rotary motion between the charting surface and the indicating means in accordance with the azimuth coordinate of the apparatus and another electro-mechanical circuit responsive also to said speed and direction indicators and to said first-mentioned circuit for producing relative traversement between the indicating means and the surface in proportion to said range coordinate.

40. Apparatus according to claim 39 in which the second-mentioned electro-mechanical circuit includes means for providing a voltage representing the distance of said apparatus from the reference point, a servo-motor system for producing the traversement of the indicating means with respect to the chart surface in accordance with said voltage and means operated in response to said voltage for changing said proportion between said traversement and said change in distance.

41. Apparatus according to claim 39 in combination with a source of signals adapted to simulate the signals of one or more radio beams each having an origin at said reference point and a bearing with respect to said reference direction, means for receiving and means for controlling the intensity of the signals in accordance with said instant polar coordinates of the apparatus, the controlling means comprising an azimuth volume control circuit responsive to said first-mentioned electro-mechanical circuit and a range volume control circuit responsive to said second-mentioned electro-mechanical circuit.

42. In combination with training apparatus adapted to simulate the movement of a craft with respect to one or more radio beams, a source of signals adapted to represent the signals of said one or more beams, means for receiving said signals, means comprising an azimuth and a range responsive device for controlling the intensity of said signals in accordance with the instant azimuth and range polar coordinates of said craft from a reference direction and reference point, means for operating said azimuth responsive device comprising an electro-mechanical circuit responsive to an element actuated according to the speed of the craft and to a member movable in accordance with the direction of the craft, means for operating said range responsive device comprising a servo-motor actuated by a second electro-mechanical circuit responsive to said first-mentioned circuit, said second circuit including means for providing a voltage for controlling the position of the servo-motor representing the range of said craft from the reference point, and means operated by said range voltage for changing the movement of the servo-motor to the range voltage.

43. An indicating device comprising a charting surface and a stylus associated therewith, servo-motor means for producing a relative motion between said surface and said stylus in accordance with a given function, second servo-motor means for independently and conjointly producing a second relative motion between said surface and stylus in accordance with a second given function, each of said servo-motor means comprising an electric motor, a thermionic tube amplifier connected to control the motor and having two input circuits, one of said circuits being energized by a voltage having a parameter varying in accordance with the function associated with said particular servo-motor means and a second input circuit energized by a second voltage having a parameter varied by operation of the motor of said particular servo-motor means in such manner as to balance the parameter applied to said first input circuit of said amplifier.

44. The combination of apparatus of the character described maneuvering with respect to a Cartesian coordinate reference system having axes $x$ and $y$, of means for determining the instant position coordinates $x_p$ and $y_p$ of said apparatus in said coordinate system during said maneuver; said position determining means comprising means for providing a pair of potentials $x_v$ and $y_v$ varying respectively in accordance with the components of velocity of said apparatus along said $x$ and $y$ axes, indivdual means for separately integrating the $x_v$ and $y_v$ potentials with respect to time, said integrating means each comprising motive means energized under control of a thermionic tube amplifier, a first input circuit for the amplifier energized in accordance with its respective $x_v$ or $y_v$ potential, a second input circuit for said amplifier comprising condenser means for supplying inverse feed-back current and potential means therefor, switching means operated by said motive means for effecting alternately condenser charge and discharge and determining the polarity of said feed-back current in accordance with the direction of operation of said motive means, and an element adapted to represent the respective $x_p$ or $y_p$ position coordinate of the apparatus moved by said motive means.

45. In combination with grounded apparatus adapted to simulate the flight of an aircraft including drift, of means for providing a first pair of voltages each of which has a parameter varying in accordance with the component representing airspeed of said flight along respective Cartesian coordinate axes $x$ and $y$, means for providing a second pair of voltages each of which has a parameter varying in accordance with the velocity of drift along respective of said $x$ and $y$ axes, integrating means responsive conjointly to the voltage parameters of the $x$ axis for determining the position of the aircraft at any instant along said $x$ axis, and integrating means responsive conjointly to the voltage parameters of the $y$ axis for determining the position of the aircraft at any instant along said $y$ axis.

46. The combination with apparatus adapted to simulate the movement of a craft with respect to a radio station, of an element movable in accordance with the speed of said craft and a second element movable in response to the heading of the craft with respect to a reference direction, a velocity resolver responsive conjointly to said elements for moving a pair of members in accordance with the components of velocity of the craft along $x$ and $y$ axes respectively of a reference Cartesian coordinate system, means for separately integrating the motions of said members with respect to time for determining the instant Cartesian position coordinates of the craft in said Cartesian system, a Cartesian to polar coordinate converter actuated by the integrating means, a direction indicator showing the relative direction of the craft and radio station, and means responsive to said polar coordinate converter for operating said direction indicator.

47. A recording device comprising an indicating surface, a stylus associated with said surface and movable with respect thereto, means for producing relative motion between said surface and said stylus in accordance with control voltages represented as position-designating voltages $E_x$ and $E_y$, said means comprising an angularly adjustable resolver energized by the control voltages for deriving a voltage varying according to the difference between the values $E_x \sin \theta$ and $E_y \cos \theta$ and another voltage varying according to the summation of $E_x \cos \theta$ and $E_y \sin \theta$ where $\theta$ is the angular adjustment of said resolver, power means responsive to said difference voltage for adjusting said resolver to a position causing said difference voltage to become a minimum, means responsive to the operation of said power means for producing curvilinear motion between said surface and stylus, and means responsive to said summation voltage for producing rectilinear motion between said surface and said stylus, the combination of said motions representing the variation of the voltages $E_x$ and $E_y$ with respect to each other.

48. The combination with apparatus adapted to simulate the movement of a craft with respect to a radio signal emitter, of an indicator for showing the bearing between a reference direction, the signal emitter and the craft, a member movable in accordance with the instant direction of movement of said craft, a resolver responsive to the direction member and energized by a voltage having a parameter varying in accordance with the simulated speed of the craft for deriving a voltage $x_v$ and a voltage $y_v$ each in turn having a parameter varying in accordance with the corresponding velocity component of the aircraft along axes $x$ and $y$, respectively, of a reference Cartesian coordinate system, means for separately integrating the parameters of the $x_v$ and $y_v$ voltages with respect to time, means actuated by the integrating means for deriving a pair of voltages $e_x$ and $e_y$, each voltage of said pair having a parameter adapted to respectively represent instant $x_p$ and $y_p$ Cartesian position coordinates of the craft, and means responsive to the $e_x$ and $e_y$ voltages for positioning the indicator.

49. In charting apparatus for indicating by polar coordinates the course of a maneuvering craft, electrical means operable in response to the speed and instant direction of the maneuver for resolving and integrating electrical quantities for representing the instant flight position in a Cartesian coordinate system, an azimuth unit including a rotatable chart and a range unit including a marker movable transversely with reference to said chart in accordance with respective instant range and azimuth polar coordinates of said craft from a reference point and a reference direction, motive means for operating separately said range and azimuth units, and a Cartesian to polar coordinate converter including said motive means operatively connected to said electrical means for deriving corresponding polar coordinate electrical quantities whereby said motive means are energized accordingly.

50. In charting apparatus for indicating the course of a maneuvering craft, means for deriving a voltage having a parameter varying in accordance with the speed of the maneuver, means movable in response to the instant direction of the maneuver, a range unit and an azimuth unit movable in accordance with respective instant range and azimuth polar coordinates of said craft from a reference point and reference direction, means for operating said range and azimuth units comprising resolving means responsive to said direction means and energized according to the parameter of the speed voltage for deriving a voltage $x_v$ and a voltage $y_v$ each in turn having a parameter varying in accordance with the corresponding velocity component of said craft along respective axes $x$ and $y$ of a reference Cartesian coordinate system, means for separately integrating the parameters of the $x_v$ and $y_v$ voltages with respect to time for representing the instant Cartesian coordinate position of said craft, and electro-mechanical means operatively interconnecting said integrating means and said range and azimuth units for converting said Cartesian coordinate position to a corresponding polar coordinate position for representation by said charting apparatus.

51. The combination of apparatus of the character described for maneuvering with respect to a reference point having a speed representing means and a course direction representing means, with a device for charting the course of the apparatus and operating according to range and azimuth polar coordinates of the instant position of the apparatus with respect to a reference point and a reference direction, said charting device comprising a charting surface and a position indicating element each movable with respect to each other, electro-mechanical means responsive conjointly to the speed means and to the direction means for producing rotary motion between the charting surface and the position indicating element in accordance with the azimuth coordinate of the apparatus and a second electro-mechanical means controlled in accordance with the operation of said first-named electro-mechanical means and also responsive conjointly to said speed and direction means for producing relative rectilinear movement between the charting surface and position indicating element in accordance with the range coordinate.

52. Flight training apparatus for simulating flight maneuvers with respect to a simulated radio station comprising means for producing electrical potentials representing instant flight position coordinates, means responsive to said flight position potentials for moving an element to represent range from said station, means responsive to said flight position potentials for rotating a second element about a center representing said station to represent azimuth with respect to said station, a source of signals, means for attenuating said signals in accordance with the positions of said range and azimuth elements to represent those that would be received at the corresponding position on an actual radio range, a receiver for said signals, means for varying another potential in accordance with the position of said range element for balancing said flight position potentials when the range position of said element corresponds to that represented by the instant flight position, and means operable for producing a null-voltage condition when the angular position of said azimuth element corresponds to the azimuthal flight position determined by said flight potentials whereby said elements are caused to seek the simulated instant flight position for controlling said signals.

53. Aircraft training apparatus for maneuvering with respect to a radio station positioned at the origin of a reference polar coordinate system comprising means responsive to a control quantity representing simulated speed of the maneuver, means controlled according to the simulated aircraft direction, a source of signals adapted to represent the signals of one or more radio beams, an azimuth device and a range device for controlling the intensity of said signals in accordance with the instant azimuth and range position coordinates of the simulated flight in said polar coordinate system, a receiver for the signals, resolving and integrating means controlled in accordance with the actuation of said speed responsive and direction responsive means for representing the instant position of said flight in a reference Cartesian coordinate system, and a Cartesian to polar coordinate converter responsive to said resolving and integrating means and including operating means for said azimuth and range devices respectively for controlling said signals in accordance with the instant position of said flight.

54. Aircraft training apparatus for charting maneuvers with respect to a radio station positioned at the origin of a reference polar coordinate system comprising means responsive to a control quantity representing simulated speed of the maneuver, means controlled according to simulated aircraft direction, a source of signals adapted to represent the signals of one or more radio beams, an azimuth device and a range device for controlling the intensity of said signals in accordance with the instant azimuth and range position coordinates of the apparatus in said polar coordinate system, a receiver for the signals, resolving and integrating means controlled in accordance with the actuation of said speed responsive and direction responsive means for representing the instant position of the simulated flight position in a reference Cartesian coordinate system, a Cartesian to polar coordinate converter responsive to said resolving and integrating means for positioning said azimuth and range devices and controlling said signals, a rotatable chart connected to said azimuth device and an indicator element connected to said range device for representing the instant position of said flight in said reference polar coordinate system.

55. Flight training apparatus for simulating and charting flight maneuvers with respect to a simulated station comprising means for producing electrical potentials representing instant flight position coordinates, means responsive conjointly to said potentials for moving a charting element to represent range of said flight from said station, means for providing a balancing potential of predetermined magnitude, means for varying said potential in accordance with the range position of said charting element for balancing said electrical potentials when the range position of said element corresponds to that represented by the instant flight position whereby said element is caused to seek said balancing instant flight position, and electro-responsive means for arbitrarily changing the magnitude of said balancing potential when the range corresponds to a predetermined value thereby changing the scale factor of movement of said charting element.

56. Flight training apparatus including charting means having a charting surface and a stylus for simulating flight maneuvers with respect to a simulated station, comprising means for producing electrical potentials representing instant flight position coordinates, means responsive to said potentials for moving said stylus with respect to said charting surface, electrical position seeking means for balancing said potentials when the position of said stylus corresponds to that represented by the instant flight position potentials, and electro-responsive means for lifting said stylus from said charting surface in accordance with a temporary predetermined degree of unbalance between and said position-seeking means and electrical potentials.

57. Flight training apparatus for simulating flight maneuvers with respect to a radio station comprising means responsive to change in instant simulated flight position for moving two elements representing range and azimuth respectively, a source of simulated radio range signals, means controlled by said range and azimuth elements for attenuating said signals in accordance with the said flight position, a receiver for the attenuated signals, means operable when a predetermined range position is reached for changing the scale factor of movement of said range element, and compensating means controlled in accordance with said scale factor change for maintaining the signal intensity at a level corresponding to the instant flight position.

58. Flight training apparatus for simulating flight maneuvers with respect to a simulated radio range station and radio marker stations comprising means responsive to simulated air speed and direction for moving with respect to said radio range station two elements representing range and azimuth respectively, means for producing signals representing said range and marker stations respectively, means controlled by said range and azimuth elements for attenuating said signals in accordance with the instant flight position, a receiver for the attenuated signals, electro-responsive means energized in accordance with a predetermined range value of said instant flight position for changing the scale factor of movement of said range element between normal and an expanded scale, and means controlled in accordance with said scale factor change for establishing marker station signal operation on said expanded scale and for rendering inoperative the marker signal means on said normal scale.

59. Flight training apparatus for simulating flight maneuvers with respect to a radio station comprising means responsive to change in instant simulated flight position for moving course indicating means, a source of simulated radio range signals, means for attenuating said signals in accordance with the flight position as to range and azimuth, a receiver for the attenuated signals, means operable when a predetermined range position with respect to said station is reached for changing the scale factor of movement of said course indicating means and compensating means controlled by and in accordance with said scale factor change for maintaining the signal intensity at a level corresponding to the instant flight position.

60. In grounded aircraft training apparatus adapted to simulate the flight of an aircraft including wind drift, computing and course recording means comprising means for deriving a first pair of voltages each of which has a parameter varying in accordance with the component representing air speed of said flight along respective Cartesian coordinate axes $x$ and $y$, additional means for deriving a second pair of voltages each of which has a parameter varying in accordance with the velocity of drift along said $x$ and $y$ axes respectively, means for summing respectively the $x$ voltages and $y$ voltages, integrating means including a motor responsive conjointly to the summed voltage parameters of the $x$ axis for determining the instant position of the aircraft along said $x$ axis, integrating means including a second motor responsive conjointly to the summed voltage parameters of the $y$ axis for determining the instant position of the aircraft along said $y$ axis, each of said integrating motors being controlled by negative feedback for establishing a direct relation between the motor speed and the parameter of the resultant input voltage, coordinate converter apparatus energized according to the magnitude of the aforesaid instant $x$ and $y$ position values, and polar coordinate charting apparatus including a rotatable chart and a cooperating transversely movable marker controlled by said converter apparatus.

RICHARD CARL DEHMEL.

REFERENCES CITED

The following references are of record in the file of this patent:

UNITED STATES PATENTS

| Number | Name | Date |
|---|---|---|
| 1,293,747 | Ford | Feb. 11, 1919 |
| 1,642,702 | Strom | Sept. 20, 1927 |
| 1,687,555 | Gasiorowski | Oct. 16, 1928 |
| 1,842,067 | Bredouw | Jan. 19, 1932 |
| 1,888,467 | Mueller | Nov. 22, 1932 |
| 1,946,565 | Baumann | Feb. 13, 1934 |
| 2,069,152 | Kohler | Jan. 26, 1937 |
| 2,070,178 | Pottenger | Feb. 9, 1937 |
| 2,080,186 | Reymond | May 11, 1937 |
| 2,136,944 | Hart | Nov. 15, 1938 |
| 2,149,440 | Jackson | Mar. 7, 1939 |
| 2,164,412 | Koster | July 4, 1939 |
| 2,179,663 | Link | Nov. 14, 1939 |
| 2,226,726 | Kramer | Dec. 31, 1940 |
| 2,266,449 | Ullrich | Dec. 16, 1941 |
| 2,271,296 | Hargrave | Jan. 27, 1942 |
| 2,314,497 | Hargrave | Mar. 23, 1943 |
| 2,321,799 | Cone | June 15, 1943 |
| 2,326,764 | Crane | Aug. 17, 1943 |
| 2,332,475 | Sorensen | Oct. 19, 1943 |
| 2,332,523 | Norden | Oct. 26, 1943 |
| 2,350,351 | Grunberg | June 6, 1944 |
| 2,355,685 | Stout | Aug. 15, 1944 |
| 2,366,603 | Dehmel | Jan. 2, 1945 |
| 2,385,334 | Davey | Sept. 25, 1945 |
| 2,399,726 | Doyle | May 7, 1946 |
| 2,404,387 | Lovell | July 23, 1946 |
| 2,408,081 | Lovell | Sept. 24, 1946 |
| 2,417,229 | Alexanderson | Mar. 11, 1947 |

FOREIGN PATENTS

| Number | Country | Date |
|---|---|---|
| 384,971 | Great Britain | 1931 |
| 540,736 | Great Britain | 1941 |
| 852,687 | France | 1939 |

OTHER REFERENCES

A. P. C. application of W. Grunberg, Serial No. 322,289, published June 1, 1943, Patent 2,350,351.